(12) United States Patent
Kniemeyer

(10) Patent No.: US 11,321,904 B2
(45) Date of Patent: May 3, 2022

(54) METHODS AND SYSTEMS FOR CONTEXT PASSING BETWEEN NODES IN THREE-DIMENSIONAL MODELING

(71) Applicant: MAXON Computer GmbH, Friedrichsdorf (DE)

(72) Inventor: Ole Kniemeyer, Bremen (DE)

(73) Assignee: MAXON Computer GmbH, Friedrichsdorf (DE)

(*) Notice: Subject to any disclaimer, the term of this patent is extended or adjusted under 35 U.S.C. 154(b) by 0 days.

(21) Appl. No.: 17/005,766

(22) Filed: Aug. 28, 2020

(65) Prior Publication Data

US 2021/0065424 A1     Mar. 4, 2021

Related U.S. Application Data

(60) Provisional application No. 62/895,270, filed on Sep. 3, 2019, provisional application No. 62/894,460, filed on Aug. 30, 2019.

(51) Int. Cl.
*G06T 15/00* (2011.01)
(52) U.S. Cl.
CPC .................... *G06T 15/005* (2013.01)
(58) Field of Classification Search
None
See application file for complete search history.

(56) References Cited

U.S. PATENT DOCUMENTS 4,730,186 A    3/1988  Koga et al.
4,963,967 A   10/1990  Orland et al.
(Continued)

FOREIGN PATENT DOCUMENTS

EP    0916374 A2    5/1999
EP    2230666 A2    9/2010
(Continued)

OTHER PUBLICATIONS

Shrstha et al., "Synchronization of Multi-Camera Video Recordings Based on Audio", MM '07: Proceedings of the 15th ACM international conference on Multimedia, Sep. 2007, Augsburg, Bavaria, Germany, pp. 545-548, 5 pages. https://doi.org/10.1145/1291233.1291367.

(Continued)

*Primary Examiner* — Michelle Chin
(74) *Attorney, Agent, or Firm* — DLA Piper, LLP (US)

(57) ABSTRACT

Systems and methods are disclosed for generating an optimized shading graph in a modeling application. One method comprises receiving a plurality of nodes in a shading graph, the plurality of nodes being connected via a plurality of explicit connections and one or more of the plurality of nodes comprising one or more internal connections. One or more implicit context connections are determined between the plurality of nodes. Additionally, one or more actual implicit context connections are determined based on the one or more implicit context connections and the one or more internal connections. Furthermore, one or more shortcuts are determined based on one or more of i) the plurality of explicit connections, ii) the one or more implicit context connections, and iii) the one or more actual implicit context connections. One or more inactive nodes and/or one or more inactive connections are also removed from the shading graph.

20 Claims, 20 Drawing Sheets

(56) References Cited

U.S. PATENT DOCUMENTS

| | | |
|---|---|---|
| 5,040,081 A | 8/1991 | McCutchen |
| 5,086,495 A | 2/1992 | Gray et al. |
| 5,519,828 A | 5/1996 | Rayner |
| 5,623,612 A | 4/1997 | Haneda et al. |
| 5,664,132 A | 9/1997 | Smith |
| 5,828,360 A | 10/1998 | Anderson et al. |
| 5,933,153 A | 8/1999 | Deering et al. |
| 5,936,671 A | 8/1999 | Van Beek et al. |
| 5,982,909 A | 11/1999 | Erdem et al. |
| 5,986,662 A | 11/1999 | Argiro et al. |
| 6,108,006 A | 8/2000 | Hoppe |
| 6,144,378 A | 11/2000 | Lee et al. |
| 6,389,173 B1 | 5/2002 | Suzuki et al. |
| 6,448,987 B1 | 9/2002 | Easty et al. |
| 6,452,875 B1 | 9/2002 | Lee et al. |
| 6,549,219 B2 | 4/2003 | Selker |
| 6,728,682 B2 | 4/2004 | Fasciano |
| 6,771,263 B1 | 8/2004 | Behrens et al. |
| 6,839,462 B1 | 1/2005 | Kitney et al. |
| 6,888,916 B2 | 5/2005 | Launay et al. |
| 6,973,200 B1 | 12/2005 | Tanaka et al. |
| 6,993,399 B1 | 1/2006 | Covell et al. |
| 7,290,704 B1 | 11/2007 | Ball et al. |
| 7,372,472 B1 | 5/2008 | Bordeleau et al. |
| 7,401,731 B1 | 7/2008 | Pletz et al. |
| 7,413,113 B1 | 8/2008 | Zhu |
| 7,423,645 B2 | 9/2008 | Dougherty et al. |
| 7,439,975 B2 | 10/2008 | Hsu |
| 7,487,170 B2 | 2/2009 | Stevens |
| 7,512,886 B1 | 5/2009 | Herberger et al. |
| 7,584,152 B2 | 9/2009 | Gupta et al. |
| 7,603,623 B1 | 10/2009 | Lengeling et al. |
| 7,668,243 B2 | 2/2010 | Ho et al. |
| 7,692,724 B2 | 4/2010 | Arora et al. |
| 7,701,445 B2 | 4/2010 | Inokawa et al. |
| 7,730,429 B2 | 6/2010 | Kruse et al. |
| 7,831,521 B1 | 11/2010 | Ball et al. |
| 8,103,545 B2 | 1/2012 | Ramer et al. |
| 8,140,389 B2 | 3/2012 | Altberg et al. |
| 8,205,148 B1 | 6/2012 | Sharpe et al. |
| 8,336,770 B2 | 12/2012 | Grillion |
| 8,345,046 B2 | 1/2013 | Norrby |
| 8,375,329 B2 | 2/2013 | Drayton et al. |
| 8,560,449 B1 | 10/2013 | Sears |
| 8,698,806 B2 | 4/2014 | Kunert et al. |
| 9,223,488 B1 | 12/2015 | Lajoie |
| 9,449,647 B2 | 9/2016 | Sharpe et al. |
| 9,478,033 B1 | 10/2016 | Sharpe et al. |
| 10,434,717 B2 | 10/2019 | Boettcher et al. |
| 2002/0094135 A1 | 7/2002 | Caspi et al. |
| 2002/0122113 A1 | 9/2002 | Foote |
| 2002/0123938 A1 | 9/2002 | Yu et al. |
| 2003/0146915 A1 | 8/2003 | Brook et al. |
| 2003/0160944 A1 | 8/2003 | Foote et al. |
| 2003/0179740 A1 | 9/2003 | Baina et al. |
| 2004/0148159 A1 | 7/2004 | Crockett et al. |
| 2004/0170392 A1 | 9/2004 | Lu et al. |
| 2005/0046889 A1 | 3/2005 | Braudaway |
| 2005/0162395 A1 | 7/2005 | Unruh |
| 2005/0165840 A1 | 7/2005 | Pratt et al. |
| 2005/0199714 A1 | 9/2005 | Brandt et al. |
| 2006/0008247 A1 | 1/2006 | Minami et al. |
| 2006/0078305 A1 | 4/2006 | Arora et al. |
| 2006/0098007 A1 | 5/2006 | Rouet et al. |
| 2006/0123445 A1 | 6/2006 | Sullivan et al. |
| 2006/0150072 A1 | 7/2006 | Salvucci |
| 2006/0212704 A1 | 9/2006 | Kirovski et al. |
| 2006/0290695 A1 | 12/2006 | Salomie |
| 2007/0002047 A1 | 1/2007 | Desgranges et al. |
| 2007/0075998 A1 | 4/2007 | Cook et al. |
| 2007/0100773 A1 | 5/2007 | Wallach |
| 2007/0189708 A1 | 8/2007 | Lerman et al. |
| 2007/0230765 A1 | 10/2007 | Wang et al. |
| 2007/0256029 A1 | 11/2007 | Maxwell |
| 2007/0257909 A1 | 11/2007 | Kihslinger |
| 2008/0005130 A1 | 1/2008 | Logan et al. |
| 2008/0021787 A1 | 1/2008 | Mackouse |
| 2008/0033880 A1 | 2/2008 | Fiebiger et al. |
| 2008/0079851 A1 | 4/2008 | Stanger et al. |
| 2008/0082510 A1 | 4/2008 | Wang et al. |
| 2008/0099552 A1 | 5/2008 | Grillion |
| 2008/0117204 A1 | 5/2008 | Thom |
| 2008/0150937 A1 | 6/2008 | Lundstrom et al. |
| 2008/0162577 A1 | 7/2008 | Fukuda et al. |
| 2008/0177663 A1 | 7/2008 | Gupta et al. |
| 2008/0256448 A1 | 10/2008 | Bhatt |
| 2008/0301341 A1 | 12/2008 | Mosek et al. |
| 2008/0306790 A1 | 12/2008 | Otto et al. |
| 2009/0063312 A1 | 3/2009 | Hurst |
| 2009/0087161 A1 | 4/2009 | Roberts et al. |
| 2009/0157519 A1 | 6/2009 | Bishop et al. |
| 2009/0167942 A1 | 7/2009 | Hoogenstraaten et al. |
| 2009/0171683 A1 | 7/2009 | Hoyos et al. |
| 2009/0192904 A1 | 7/2009 | Patterson et al. |
| 2009/0198614 A1 | 8/2009 | De Ruiter et al. |
| 2009/0231337 A1 | 9/2009 | Carr et al. |
| 2009/0254864 A1 | 10/2009 | Whittington et al. |
| 2009/0279453 A1 | 11/2009 | Yeh et al. |
| 2009/0318800 A1 | 12/2009 | Gundel et al. |
| 2010/0050083 A1 | 2/2010 | Axen et al. |
| 2010/0063903 A1 | 3/2010 | Whipple et al. |
| 2010/0083077 A1 | 4/2010 | Paulsen et al. |
| 2010/0146393 A1 | 6/2010 | Land et al. |
| 2010/0183280 A1 | 7/2010 | Beauregard et al. |
| 2010/0185985 A1 | 7/2010 | Chmielewski et al. |
| 2010/0192101 A1 | 7/2010 | Chmielewski et al. |
| 2010/0192102 A1 | 7/2010 | Chmielewski et al. |
| 2010/0228669 A1 | 9/2010 | Karim |
| 2010/0333030 A1 | 12/2010 | Johns |
| 2012/0290609 A1 | 11/2012 | Britt |
| 2013/0073500 A1* | 3/2013 | Szatmary ................ G06N 3/04 706/27 |
| 2013/0151413 A1 | 6/2013 | Sears |
| 2013/0328870 A1 | 12/2013 | Grenfell |
| 2014/0132603 A1 | 5/2014 | Raghoebardayal |
| 2015/0134095 A1 | 5/2015 | Hemani et al. |
| 2015/0149314 A1 | 5/2015 | Sears |
| 2015/0161595 A1 | 6/2015 | Sears |
| 2015/0279071 A1 | 10/2015 | Xin |
| 2015/0331968 A1 | 11/2015 | Crocker |
| 2019/0258693 A1 | 8/2019 | Lawrence |
| 2021/0271784 A1 | 9/2021 | Marl et al. |
| 2022/0068022 A1 | 3/2022 | Kemmler |

FOREIGN PATENT DOCUMENTS

| | | |
|---|---|---|
| JP | 2008305241 A | 12/2008 |
| WO | WO0139130 A1 | 5/2001 |
| WO | WO2004040576 A1 | 5/2004 |
| WO | WO2009042858 A1 | 4/2009 |
| WO | WO2010034063 A1 | 4/2010 |
| WO | WO2010068175 A2 | 6/2010 |
| WO | WO2010138776 A2 | 12/2010 |
| WO | WO2016179401 A1 | 11/2016 |

OTHER PUBLICATIONS

Haitsma, J. et al., "A Highly Robust Audio Fingerprinting System", IRCAM, 2002, 9 pages.

Toklu et al., "Semi-automatic video object segmentation in the presence of occlusion", Jun. 2000, IEEE Transactions on Circuits and Systems for Video Technology, vol. 10, iss. 624-629, 3 pages.

Toklu et al., "Two-dimensional triangular mesh-based mosaicking for object tracking in the presence of occlusion", Jan. 10, 1997, Proc. SPIE, Visual Communications and Image Processing '97, vol. 3024, p. 328-337, 11 pages.

Toklu et al., "Tracking Motion and Intensity Variations Using Hierarchical 2-D Mesh Modeling for Synthetic Object Transfiguration", Nov. 1996, Graphical Models and Image Processing, vol. 58, No. 6, p. 553-573, 21 pages.

Jain et al., "Non-Rigid Spectral Correspondence of Triangle Meshes", Apr. 5, 2007, International Journal of Shape Modeling, 25 pages.

(56) References Cited

OTHER PUBLICATIONS

Toklu et al., "2-D mesh-based tracking of deformable objects with occlusion", Sep. 19, 1996, Proceedings of International Conference on Image Processing, 1996, vol. 1, p. 933-936, 3 pages.
Zhao et al., "An object tracking algorithm based on occlusion mesh model", 2002, Proceedings of International Conference on Machine Learning and Cybernetics, 2002, vol. 1, p. 288-292, 3 pages.
Altunbasak et al., "Occlusion-adaptive 2-D mesh tracking", May 10, 1996, Conference Proceedings ICASSP-96, vol. 4, p. 2108-2111.
Tekalp et al., "Face and 2-D mesh animation in MPEG-4", Jan. 2000, Signal Processing: Image Communication, vol. 15, issue 4-5, p. 387-421. https://doi.org/10.1016/S0923-5965(99)00055-7.
Shewchuk, "Triangle: Engineering a 2D quality mesh generator and Delaunay triangulator", 1996, Applied Computational Geometry towards Geometric Engineering Lecture Notes in Computer Science, 1996, vol. 1148, 11 pages.
Dobashi et al., Interactive Rendering method for Displaying Shafts of Light, Proceedings Computer Graphics and Applications; Oct. 2000, pp. 31-37, 435, 3 pages. DOI:10.1109/PCCGA.2000.883864.
Li et al., Unified Volumes for Light Shaft and Shadow with Scattering, 2007 10th IEEE International Conference on Computer-Aided Design and Computer Graphics, Oct. 2007, pp. 161-166.
Akenine-Moller, T., et al., Real-Time Rendering, (Second Edition, A. K. Peters, Ltd., Wellesley, MA), (202), pp. 158, 315-316.
Herndon, K. P., et al., "Interactive Shadows", UIST: Proceedings of the Fifth Annual ACM Symposium on User Interface Software and Technology, (Nov. 15-18, 1992), (1992), 1-6.
Loscos, C., et al., "Real-Time Shadows for Animated Crowds in Virtual Cities", VRST 2001. Proceedings of the ACM Symposium on Virtual Reality Software and Technology, (Nov. 15-17, 2001, Banff, Alberta, Canada), (2001), 85-92.
Woo, A., et al., "A Survey of Shadow Algorithms", IEEE Computer Graphics & Applications, (Nov. 1990), 31 pages.
Bregler, Christoph et al., "Video Rewrite: Driving Visual Speech with Audio", ACM Siggraph 97, Proceedings of the 24th Annual Conference on Computer Graphics and Interactive Techniques, 1997, ISBN: 0-89791-896-7, pp. 1-8.
Held M, Palfrader P. Skeletal structures for modeling generalized chamfers and fillets in the presence of complex miters. Computer-Aided Design and Applications. Jan. 1, 2019;16(4):620-7, 8 pages.
Palfrader, P., Weighted Skeletal Structures in Theory and Practice (Doctoral dissertation, University of Salzburg), 111 pages.
"Alaric: Euronet Worldwide to implement Alarics Fractals fraud detection solution; Fractals will provide a comprehensive fraud solution for the prevention and detection of fraudulent transactions", M2 Presswire [Coventry], Nov. 7, 2006, pp. 1-2.
Martin Held et al., 'Straight Skeletons and Mitered Offsets of Polyhedral Terrains in 3D', Computer-Aided Design and Applications, vol. 16, No. 4, 2019, pp. 611-619, Jul. 9, 2018, pp. 611-617.
Gill Barequet et al., 'Straight Skeletons of Three-Dimensional Polyhedra', arXiv:0805.0022vl, Apr. 30, 2008, pp. 1-11.

* cited by examiner

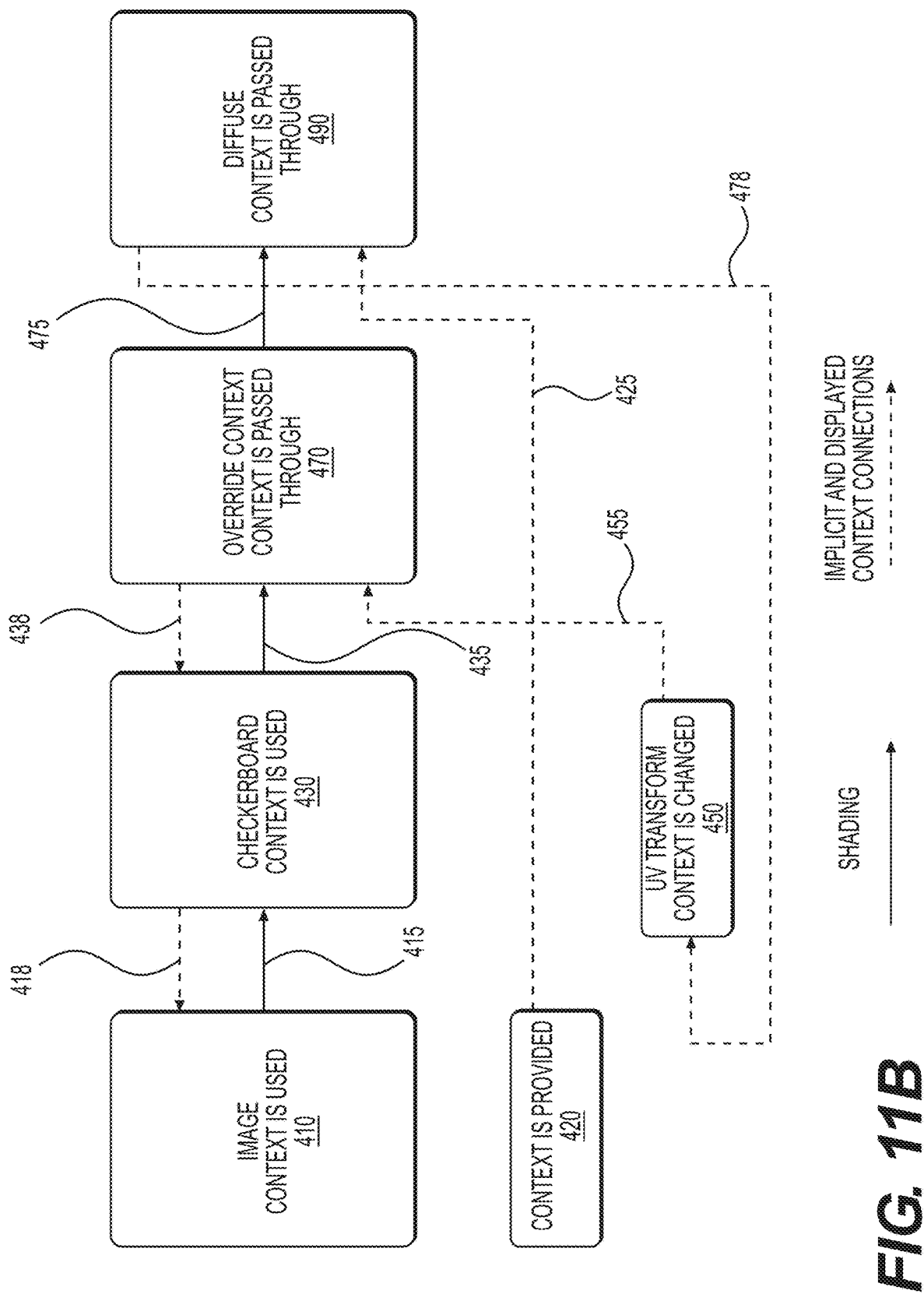

METHODS AND SYSTEMS FOR CONTEXT PASSING BETWEEN NODES IN THREE-DIMENSIONAL MODELING

CROSS-REFERENCE TO RELATED APPLICATIONS

This application claims the benefit of priority to U.S. Provisional Application No. 62/894,460, filed Aug. 30, 2019 and U.S. Provisional Application No. 62/895,270, filed Sep. 3, 2019, the entireties of which are incorporated herein by reference.

TECHNICAL FIELD

The present disclosure relates to systems and methods for three-dimensional modeling process enhancement. More particularly, the present disclosure relates to systems and methods for context passing between nodes in a shading graph.

BACKGROUND

Connected nodes in a shading graph are used to compute the color and further optical properties of a surface point of a three-dimensional (3D) object (and for some effects even of inner points not on the surface). Those graphs may be composed of i) nodes which represent computations and ii) connections between nodes to control how data flows through the graph.

The background description provided herein is for the purpose of generally presenting the context of the disclosure. Unless otherwise indicated herein, the materials described in this section are not prior art and are not admitted to be prior art, or suggestions of the prior art, by inclusion in this section.

SUMMARY OF THE DISCLOSURE

According to certain aspects of the disclosure, methods and systems are disclosed for 3D modeling process enhancement and, more particularly, for context passing between nodes in a shading graph.

In one aspect, a computer-implemented method for generating an optimized shading graph in a modeling application is provided. The computer-implemented method comprises: receiving a plurality of nodes in a shading graph, the plurality of nodes being connected via a plurality of explicit connections and one or more of the plurality of nodes comprising one or more internal connections; determining one or more implicit context connections between the plurality of nodes; determining one or more actual implicit context connections based on the one or more implicit context connections and the one or more internal connections; determining one or more shortcuts based on one or more of i) the plurality of explicit connections, ii) the one or more implicit context connections, and iii) the one or more actual implicit context connections; and removing one or more inactive nodes and/or one or more inactive connections in the shading graph.

In another aspect, a system for generating an optimized shading graph in a modeling application is provided. The system comprises at least one processor and at least one storage device storing instructions which, when executed by the at least one processor, cause the at least one processor to perform operations comprising: receiving a plurality of nodes in a shading graph, the plurality of nodes being connected via a plurality of explicit connections and one or more of the plurality of nodes comprising one or more internal connections; determining one or more implicit context connections between the plurality of nodes; determining one or more actual implicit context connections based on the one or more implicit context connections and the one or more internal connections; determining one or more shortcuts based on one or more of i) the plurality of explicit connections, ii) the one or more implicit context connections, and iii) the one or more actual implicit context connections; and removing one or more inactive nodes and/or one or more inactive connections in the shading graph.

In another aspect, at least one non-transitory computer readable medium for generating an optimized shading graph in a modeling application is provided. The at least one non-transitory computer readable medium stores instructions which, when executed by at least one processor, cause the at least one processor to perform operations comprising: receiving a plurality of nodes in a shading graph, the plurality of nodes being connected via a plurality of explicit connections and one or more of the plurality of nodes comprising one or more internal connections; determining one or more implicit context connections between the plurality of nodes; determining one or more actual implicit context connections based on the one or more implicit context connections and the one or more internal connections; determining one or more shortcuts based on one or more of i) the plurality of explicit connections, ii) the one or more implicit context connections, and iii) the one or more actual implicit context connections; and removing one or more inactive nodes and/or one or more inactive connections in the shading graph.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 11A-11D illustrate movement of contexts between nodes, upon which a shading graph transformation process is based.

DETAILED DESCRIPTION OF EMBODIMENTS

The following embodiments describe methods and systems for 3D modeling process enhancement and, more particularly, for context passing between nodes in a shading graph.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Additionally, while example nodes discussed herein may be of a particular type, techniques discussed herein may be used in relation to nodes of any type.

Figure 1:
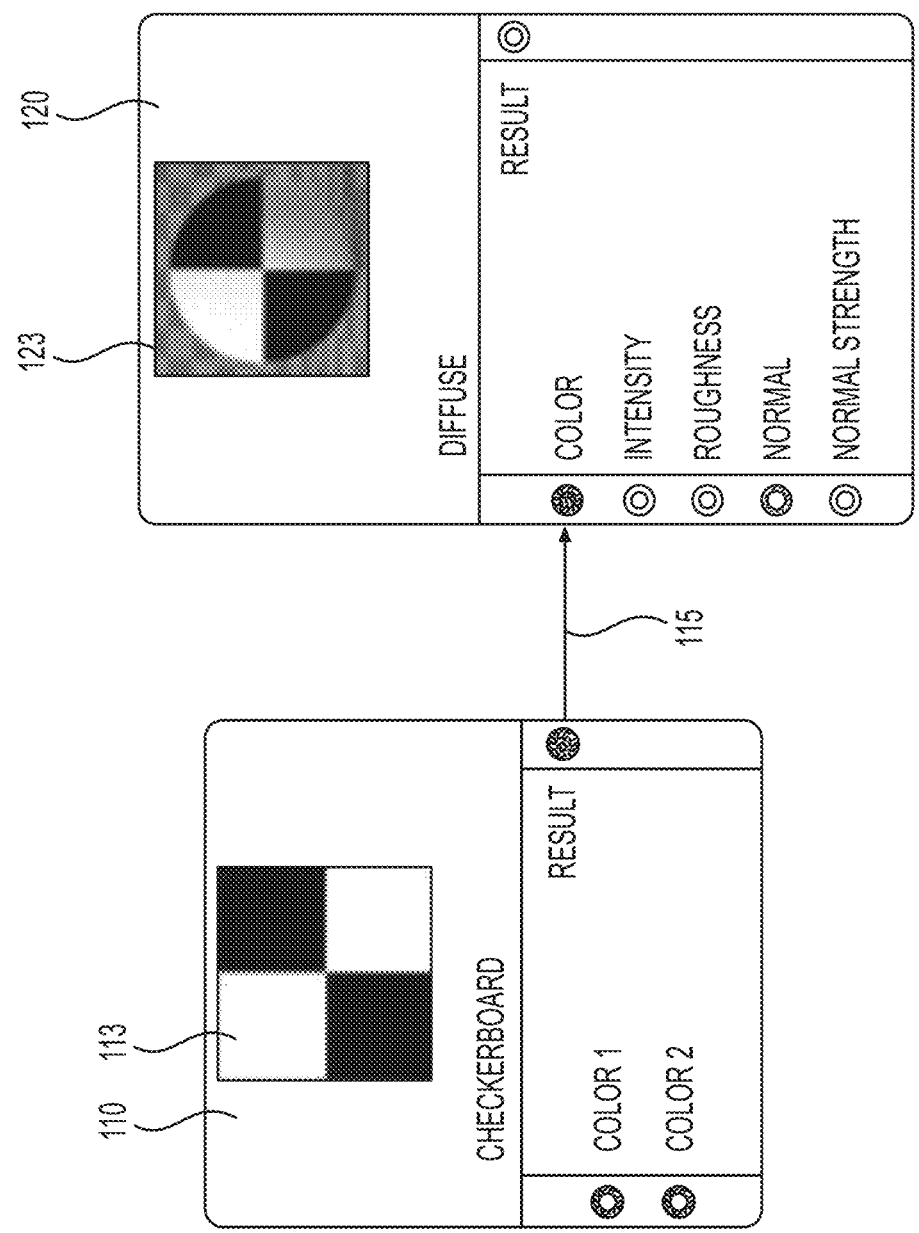
FIG. 1 shows an example of a shading graph in a 3D modeling application.

Referring now to the appending drawings, FIG. 1 shows an example of a shading graph in a 3D modeling application with two nodes. The node on the left is a checkerboard node 110 that may compute a pattern that is shown in the preview image 113 in its output port "Result." The node on the right, a diffuse node 120, may consume the pattern computed in the output port "Result" of the checkerboard node 110 via the input port "Color" to obtain the color for a surface point and draw it on a sphere in the preview image 123. Thus, the direction of the data flow represented by the connection 115 may be from upstream to downstream, for example, left to right. This is the general data flow direction (i.e., upstream to downstream) for values computed by shading nodes.

In the present disclosure, a node, such as the checkerboard node 110 in FIG. 1, that receives data from outside the node editing system and provides all or portion of the data as input to one or more other nodes, may be referred to as an input node. An input node might only have one output port, although more than one input port may be possible. Further, a node that receives input from one or more nodes, alters the received data, and provides the altered data as input to one or more nodes may be referred to as an operator node (e.g., blur node 220 in FIG. 2A, rotate context node 250 in FIG. 2B, etc.), or a processing node. An operator node may have one or more input ports as well as one or more output ports. Furthermore, a node, such as the diffuse node 120 in FIG. 1, that receives data from one or more nodes and feeds that data outside the node editing system, may be referred to as an output node. An output node might only have one input port, although more than one input port may be possible.

In typical applications, shading nodes like the checkerboard node 110 might not compute the complete pattern at once, but point for point on request. For example, when the sphere preview 123 of the diffuse node 120 (or some other algorithm) needs the color for a point, it may ask the shader subgraph to its left, i.e., the checkerboard node 110, to compute that color. Therefore, the diffuse node 120 may need to pass the point coordinates of the requested point to the checkerboard node 110. This coordinate data may be a hidden data flow in the other direction, from downstream to upstream, or in FIG. 1, right to left for example. The data flow may be hidden (i.e., not visible to the user within the shading graph) because there may be no explicit point coordinate connection from the downstream node to the upstream node (e.g., from the diffuse node 120 to the checkerboard node 110) in the shading graph. Instead, the connection for the color may be implicitly used in reverse direction, such as in an on-demand basis.

Figure 2A:
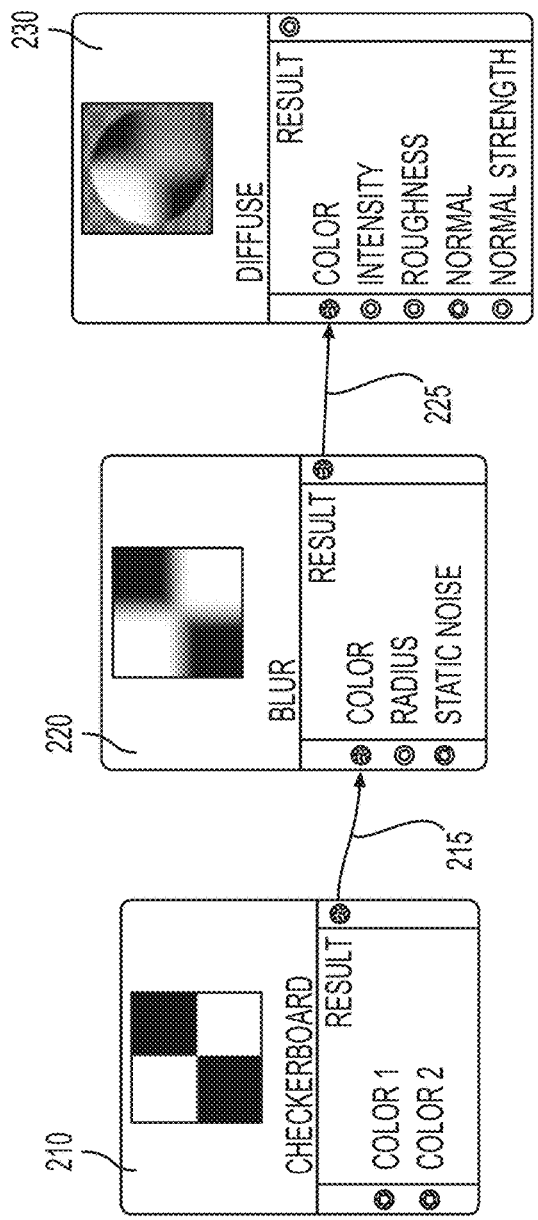
FIG. 2A show another example of a shading graph in a 3D modeling application, for the purpose of explaining a blur node.
Figure 2B:
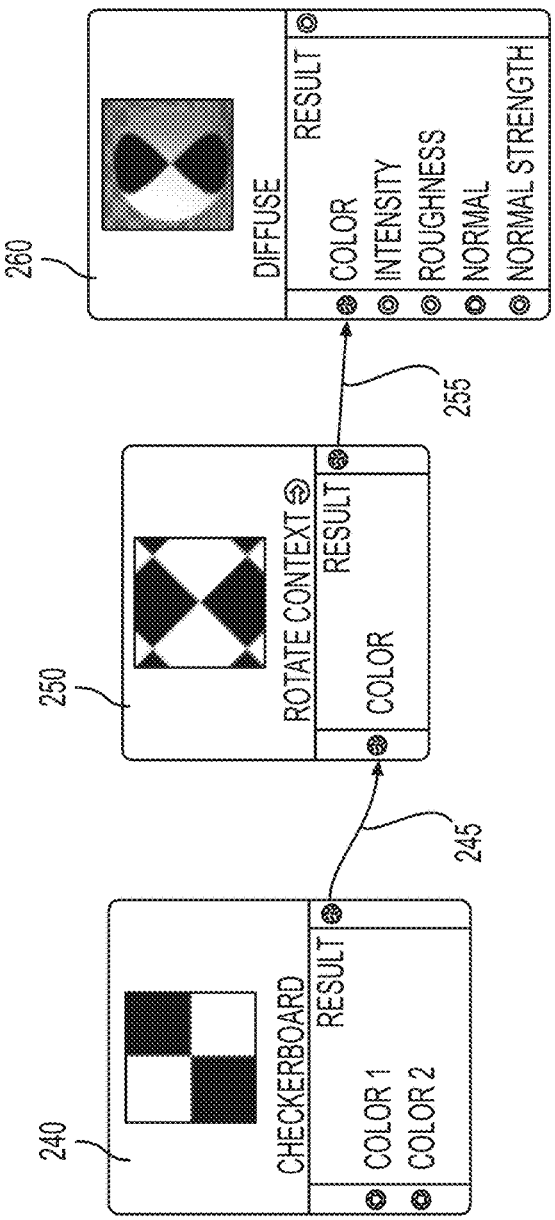
FIG. 2B shows another example of a shading graph in a 3D modeling application, for the purpose of explaining a rotate context node.

There may be nodes that need to evaluate their left-hand subgraph (i.e., an upstream node) several times. FIGS. 2A-2B depict examples of such nodes. For example, in FIG. 2A, a blur node 220 may compute the color for a given point by the average color of its input for a region around that point. Thus, as shown in FIG. 2A, the blur node 220 may need to evaluate its left-hand subgraph (i.e., an upstream node relative to the blur node 220, that is, the checkerboard node 210) not just for a single point but for a whole region, which may be approximated by a finite number of point samples of that region. Thus, the diffuse node 230 may request color information at a single point (e.g., a point that can be represented by X, Y, Z coordinates) from the blur node 220, and the blur node 220 may in turn request the color information for multiple points from the checkerboard node 210 to determine color information at the single point.

Besides the point coordinates, some nodes may need further implicit values like the current time of the 3D scene or additional information about the point for which the evaluation is performed. These values together may constitute a shading context (i.e., a context). As explained above, the shading context may be passed implicitly from downstream to upstream along connections (e.g., connections 225 and 215 in FIG. 2A and connections 255 and 245 in FIG. 2B). On its way from downstream to upstream, it may also be modified by operator nodes. The blur node 220 may be one example of such operator nodes, as it may pass, for each shading context it receives from downstream, a multitude of shading contexts upstream with points around the originally-received point. Another example may be a rotate context node 250 in FIG. 2B. The rotate context node 250 may rotate the point coordinates of the shading context received from downstream (i.e., a downstream node relative to the rotate context node 250, that is, the diffuse node 260) and pass a shading context with rotated point coordinates upstream (i.e., an upstream node relative to the rotate context node 250, that is, the checkerboard node 240).

Figure 3:
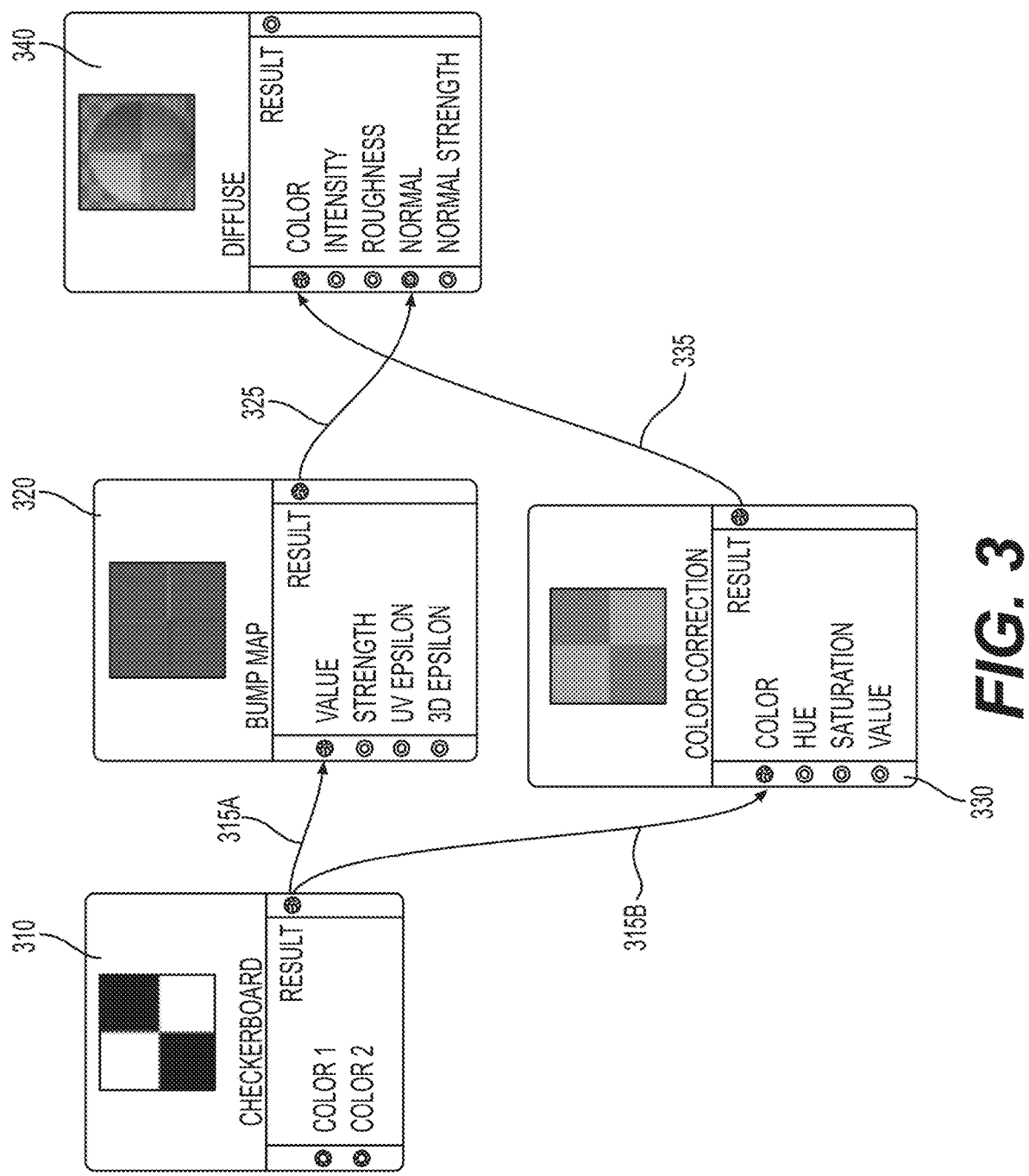
FIG. 3 shows another example of a shading graph in a 3D modeling application, for the purpose of explaining a solution for implicit data flow from downstream to upstream.

In 3D modeling applications, one technique for processing implicit data flow from downstream to upstream may be in the following manner. Instead of producing a single value (e.g., a color), an output port (e.g., a "Result" port) may represent a function which computes the value, given the shading context as an argument for the function call. Thus, a node can call its upstream neighbors with arbitrary shading contexts (i.e., data flow from downstream to upstream), and then it may receive the computed values (i.e., data flow from upstream to downstream). However, this approach may introduce overhead in terms of computation time, because an extra function call may be needed for each node, and because parts of the shading graph may need to be evaluated several times for the same shading context. For example, in FIG. 3, each of the bump map node 320 and/or the color correction node 330 may evaluate the checkerboard node 310 once for the original context coming implicitly from the output node (i.e., rightmost node in FIG. 3), that is, the diffuse node 340 (the bump map node 320 may perform two additional evaluations with modified contexts, but that may be irrelevant here) along the connections 325, 335, 315A, 315B. Because both nodes may trigger their own call of the checkerboard node 310, the checkerboard node 310 may be evaluated twice for the same context. This process might be improved by additional bookkeeping, but improving the process in such a manner might require additional computation time.

The present disclosure proposes another solution, which may make the data flow from downstream to upstream more explicit at an underlying level of the shading graph. For instance, the shading graph may be transformed such that the data flow from downstream to upstream may be more explicitly shown. This level might not be visible to the user, but may be visible to developers. The following sections describe this solution in greater detail.

Figure 4:
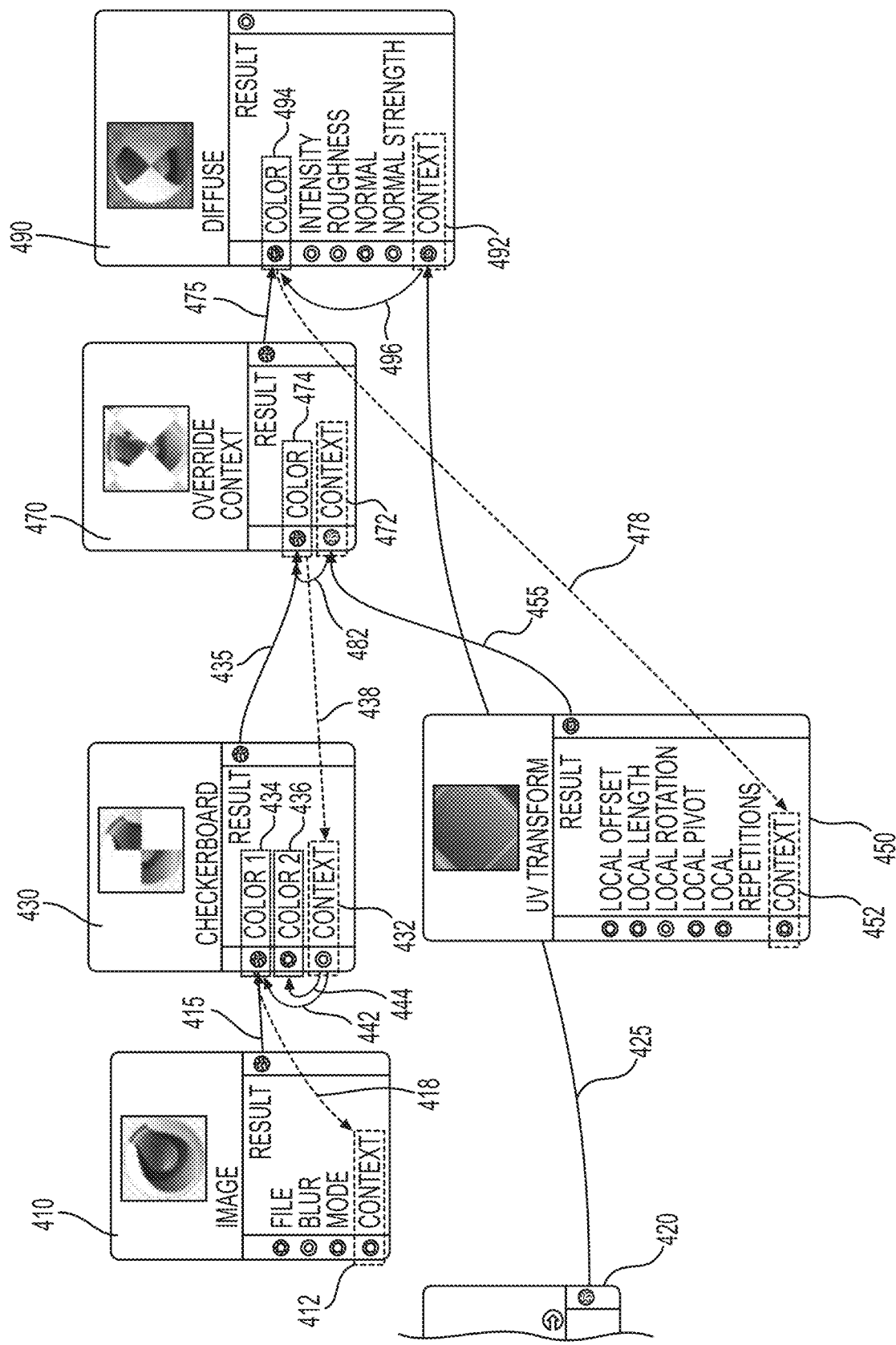
FIG. 4 shows another example of a shading graph in a 3D modeling application, for the purpose of illustrating a process of matching a context port of a node with a port of another node, which may provide a context to the context port.

FIG. 4 is a screenshot of an exemplary shading graph comprising a plurality of nodes, illustrating a process of matching a context port of a node with a port of another node that may provide a context to the context port. As shown in FIG. 4, a port of a node may be marked to introduce a context (e.g., ports 434, 436, 474, 494). In a node including such a port, the value for the introduced context may be provided from another port within the node (e.g., ports 432, 472, 492). The value for the context may be passed within the node through a special node-internal connection, which is represented by arrows 442, 444, 482, or 496, which might not be made visible to the user. This context may be introduced to an upstream subgraph/node. In other words, the context may be introduced to a subgraph or node that is situated upstream relative to the port from which the context is introduced. For example, the context at the color port 474 may be introduced to the checkerboard node 430. The process of matching a port marked to introduce a context with a port marked to receive a context will be described in detail below.

A port may be marked to receive a context (e.g., ports 412, 432, 452, 472, 492). For example, the checkerboard node 430 may receive a context at the context port 432 from the color port 474. The received value may be re-introduced as a context for the color ports 434 and/or 436 (represented as node-internal connections 442 and 444, respectively), so that the value may further be transmitted to the connected image node 410 (e.g., an input node).

The shading graph may then be analyzed to find matching pairs (e.g., implicit context connections 418, 438, and 478 pointing to context ports 412, 432, and 452). The implicit context connections 418, 438, and 478 represent the results of a matching process performed across the nodes. The image node 410 may need a context, as indicated by the marked context port 412. The context port 412 may then be matched to the color 1 port 434 of the checkerboard node 430, as the color 1 port 434 is the closest downstream port that introduces a context. A similar process may be performed for the checkerboard node 430 and UV transform node 450. The override context node 470 and diffuse node 490 may also have ports which are marked as needing a context (i.e., context port 472 and context port 492, respectively). However, because the context port 472 and the context port 492 are explicitly connected to the result port of the UV transform node 450 and the output port of the node 420, respectively, they may receive the context values via the explicit connections 455 and 425 instead of an implicit connection from a downstream node. Specifically, the context port 492 of the diffuse node 490 may receive its context from outside of the shading graph (i.e., from an external source such as, for example, the preview computation, a 3D rendering algorithm, etc.) via the node 420 (i.e., an input node). From a technical point of view, such externally-supplied ports may represent function parameters when the shading graph is compiled into a function. Thus, when the shading graph is used in a rendering, it may be called for arbitrary contexts (e.g., surface coordinates).

Figure 10:
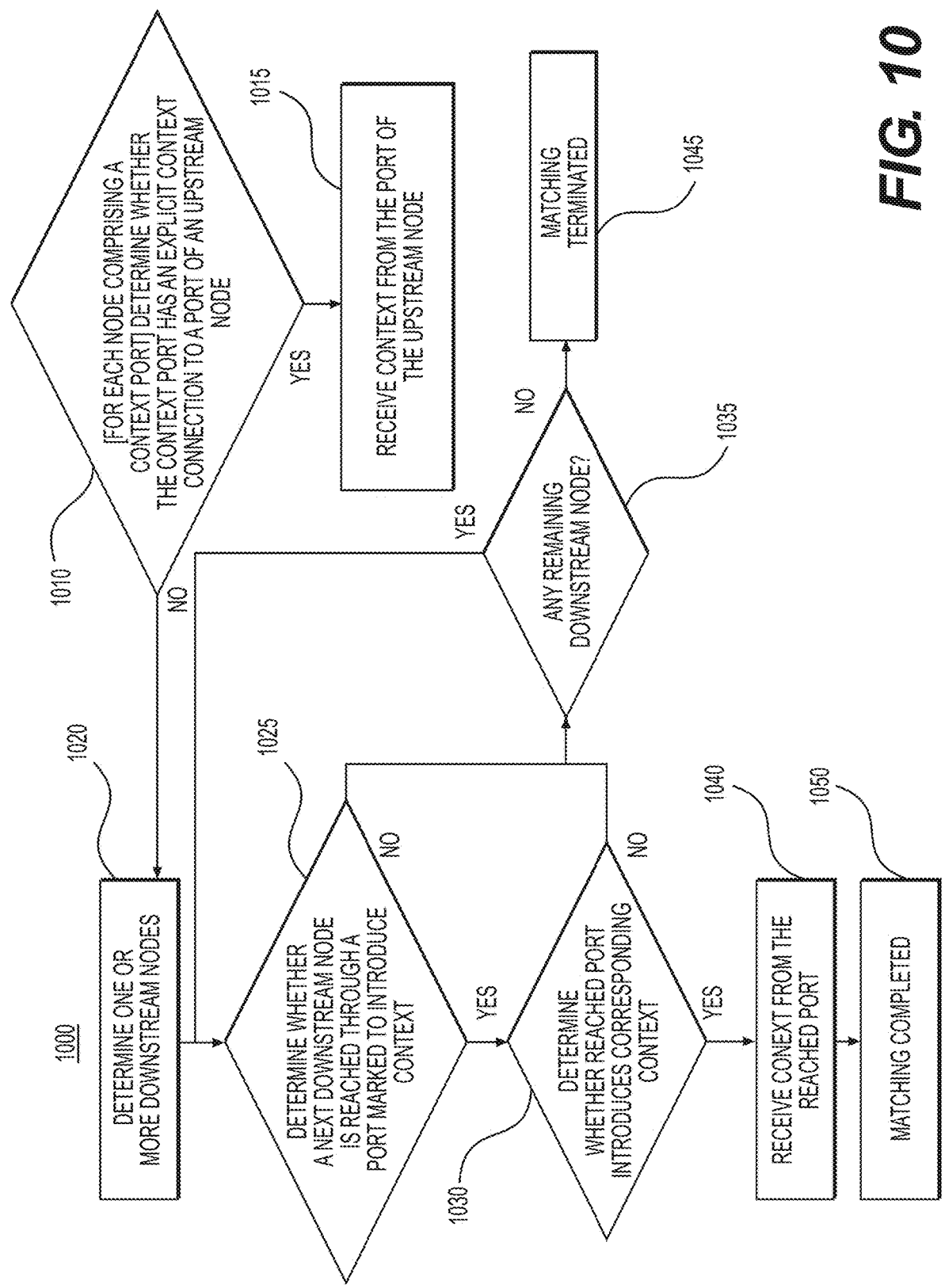
FIG. 10 is a flowchart illustrating an exemplary method of matching a context port of a node with a port of another node, which may provide a context to the context port.

FIG. 10 is a flowchart illustrating an exemplary method 1000 of matching a context port of a node with a port of another node that may provide a context to the context port. The method 1000 may be written in computer-readable instructions, and stored and executed by a computing device consistent with or similar to that depicted in FIG. 14. At step 1010, a processor of a computing device may, for one or more nodes comprising a context port, determine whether the context port has an explicit connection to a port of an upstream node. If it is determined that such an explicit connection exists at step 1010, the method 1000 may proceed to step 1015 where the processor may provide the context from the port of the upstream node to the context port of the node being processed (i.e., the node comprising the context port may receive the context from the explicitly-connected port of the upstream node). On the other hand, if it is determined that such an explicit connection does not exist at step 1010, the method 1000 may proceed to step 1020 where the processor may determine one or more downstream nodes relative to the node being processed.

At step 1020, the processor may determine (e.g., identify) one or more nodes that are downstream relative to the node being processed. In other words, the processor may determine one or more downstream nodes. At step 1025, the processor may determine whether a first of the one or more downstream nodes (e.g., a downstream node that is closest to the node being processed) is reached through a port marked to introduce a context. If it is determined that the first downstream node is not reached through a port marked to introduce a context at step 1025, the method 1000 may proceed to step 1035 where the processor may determine whether there is any remaining downstream node. If one or more downstream nodes remain, the method 1000 may loop back to step 1025 to analyze a next downstream node (e.g., a downstream node that is next closest to the node being processed). Otherwise, the method 1000 may proceed to step 1045 where the matching process is terminated. If the matching process is terminated without finding a port that provides a relevant context, the processor may display an error message via user interface of the modeling application.

If it is determined that the first downstream node is reached through a port marked to introduce a context at step 1025, the method 1000 may proceed to step 1030 where the processor may determine whether the reached port introduces a context that corresponds to the context port of the node being processed. If it is determined that the reached port does not introduce such a context, the method 1000 may proceed to step 1035 where the processor may determine whether there is any remaining downstream node. As explained above, if one or more downstream nodes remain, the method 1000 may loop back to step 1025. Otherwise, the method 1000 may proceed to step 1045 where the matching process is terminated.

If it is determined that the reached port introduces a context that corresponds to the context port of the node being processed, the method 1000 may proceed to step 1040 where the processor may provide the context from reached port to the node being processed (i.e., the node comprising the context port may receive the context from the reached port). Therefore, the processor may determine that an implicit context connection exists between the reached port of the downstream node and the context port of the node being processed. Once the implicit context connection is determined and the context is received by the node being processed, the method 1000 may proceed to step 1050 where the matching process is completed.

To summarize, in steps 1020 through 1050, for one or more nodes that comprise a context port not coupled to an explicit context connection, the processor may determine a downstream node that includes a port marked to introduce a corresponding context, and may determine (e.g., generate) an implicit connection between the context port of the node being processed and the port marked to introduce the corresponding context. If such a downstream node does not exist in the shading graph, the processor may return an error message via user interface of the modeling application.

Referring back to FIG. 4, one or more shading connections (e.g., connections 415, 435, and 475) may need a context. Every node (e.g., nodes 410, 430, 450, 470, and 490) might only have one context. The context for one or more nodes may be provided either implicitly (i.e., from a downstream node) or explicitly (i.e., via an explicit connection such as, for example, connection 425 or 455). It should be also noted that there might be any number of different contexts involved with a node, as many as there are downstream node connections (i.e., an upstream node may receive multiple contexts from downstream). Therefore in an alternative embodiment, referring back to FIG. 10, even after a node receives a context from a port of a downstream node at step 1040, the method 1000 may continue to determine whether there are any remaining downstream nodes from which additional contexts may be provided, and may provide the additional context(s) from any remaining downstream node(s). The context for a node may be obtained via one or more connections with a downstream node, except when overridden by an explicit connection. If two inputs need different contexts, an override context node (e.g., override context node 470) may need to be used by the user to adjust the context for that specific connection. In other words, an override context node may provide the user with an option to inject a new context. Further, if the context input port of a node is used, the context for all shading inputs might be changed.

It should be noted that certain arrows and rectangles shown in FIG. 4 (e.g., arrows representing the connections 418, 438, 478, 442, 444, 482, 496, and rectangles representing the ports 412, 432, 434, 436, 452, 472, 474, 492, and 494 (not the buttons and alphanumeric characters enclosed within the rectangles)) might not be visible to the user. Only the explicit connections (e.g., connections 415, 425, 435, 455, and 475) might be made visible to the user to indicate an upstream-to-downstream data flow.

Figure 5:
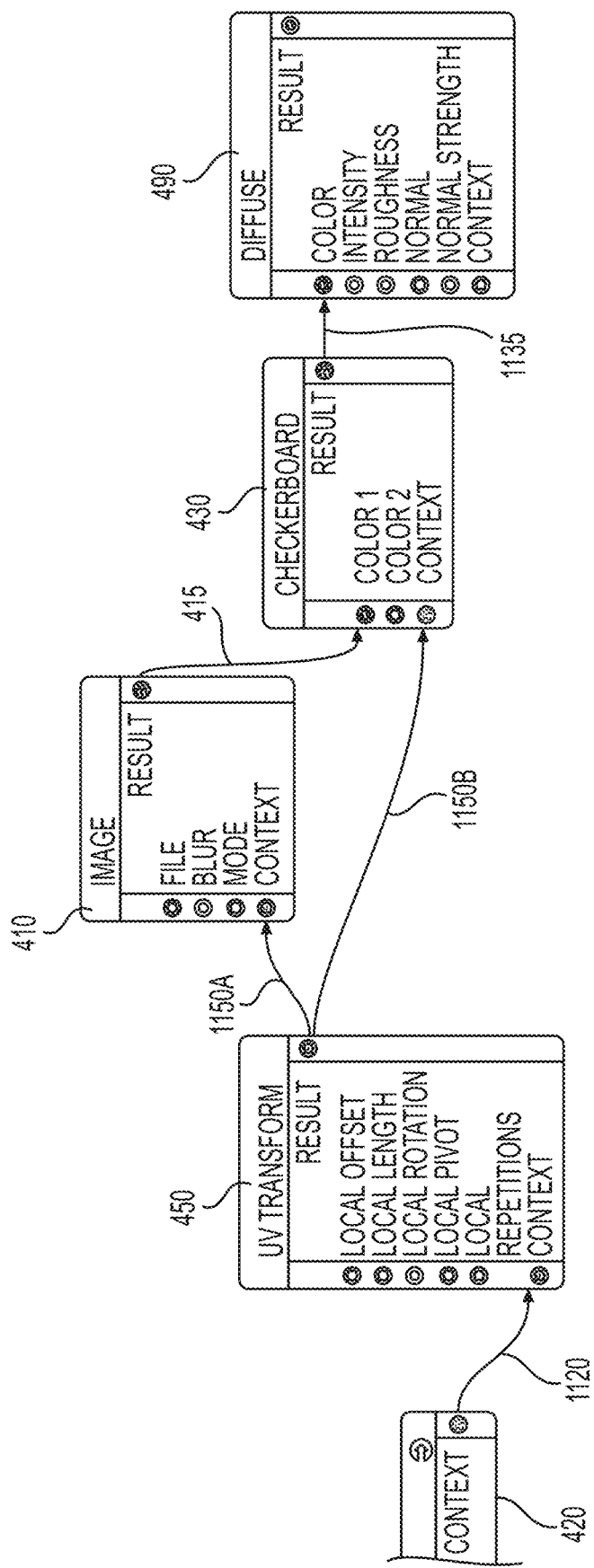
FIG. 5 shows an exemplary optimized shading graph that has been transformed from the shading graph of FIG. 4.

Following the matching step (e.g., FIG. 4 and method 1000 illustrated in FIG. 10), the shading graph may be transformed into an optimized graph that includes an upstream-to-downstream data flow incorporating explicit transfer of contexts. This transformation step may remove certain "intermediate" connections between ports. For example, with continuing reference to FIG. 4, the image node 410 may receive the context from the UV transform node 450 via ports of override context node 470 and checkerboard node 430 (e.g., context port 472, color port 474, context port 432, and color 1 port 434). Also, the override context node 470 may pass values received at the color port 474 directly to its result port. Thus, the diffuse node 490 may be considered to have received the color directly from the checkerboard node 430. Thus, the override context node 470 may be removed from the transformed shading graph (i.e., optimized shading graph), as shown in FIG. 5. The transformation step may take the shading graph of FIG. 4 and simplify the data flow illustration accordingly, and generate an optimized graph including an upstream-to-downstream-only data flow reflecting explicit transfer of contexts. FIG. 5 shows an exemplary optimized shading graph that has been transformed from the shading graph of FIG. 4, and that includes an upstream-to-downstream data flow. FIGS. 11A-11D illustrate movement of contexts between nodes, upon which the shading graph transformation process is based. As depicted in FIG. 5 and FIG. 11D, in one embodiment, the optimized shading graph may include an upstream-to-downstream data flow only. In other words, the optimized graph may be able to illustrate the entire data flow utilizing only explicit connections going from upstream to downstream (e.g., including shading connections and context connections), and might not have any counter-flowing data. In the following sections, the reference characters used for certain elements in FIGS. 4-5 will be equally used in FIGS. 11A-11D and FIGS. 12A-12D, to suggest that those elements are the same as the corresponding elements in FIGS. 11A-11D and FIGS. 12A-12D.

Figure 11A:
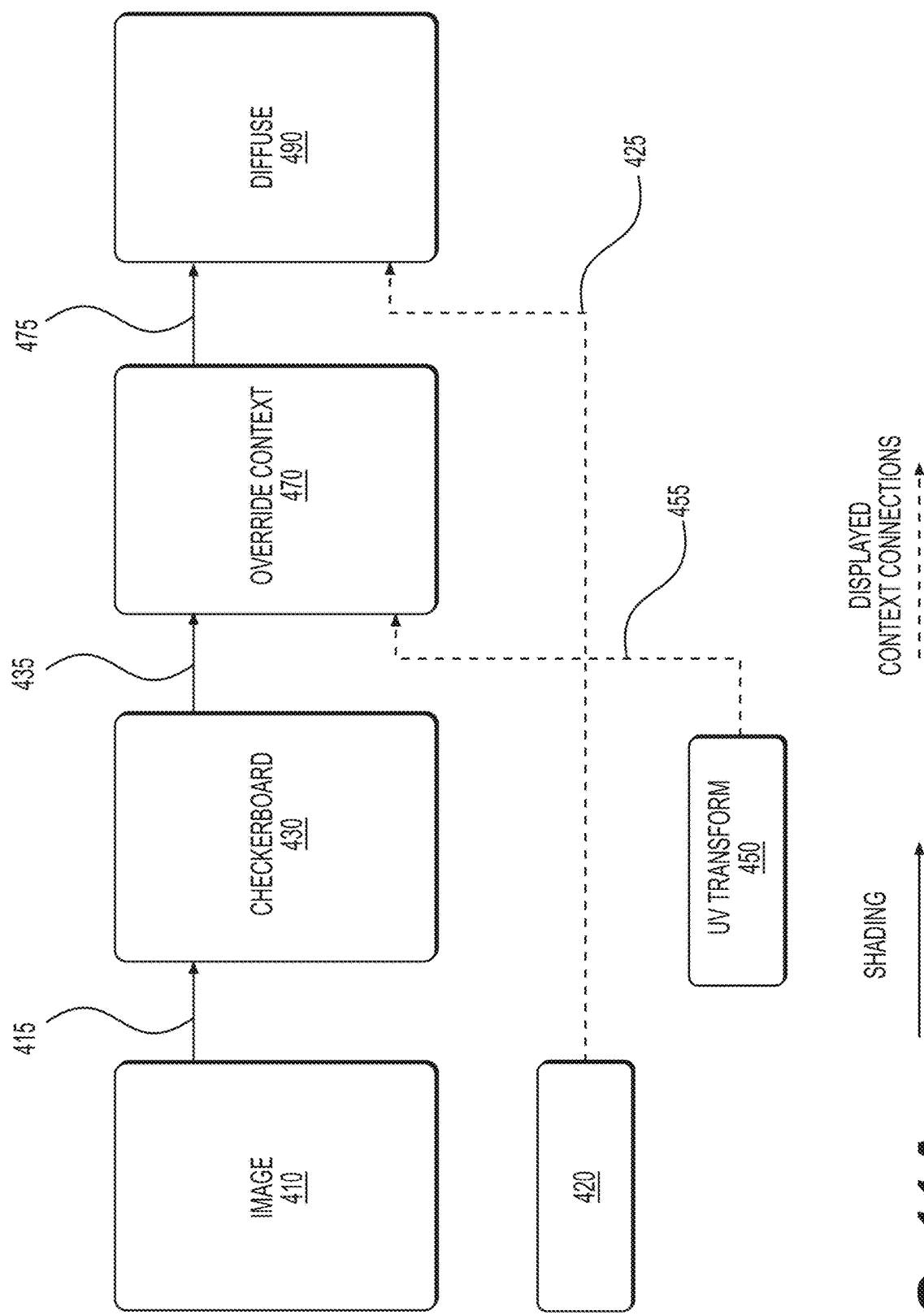
Figure 11C:
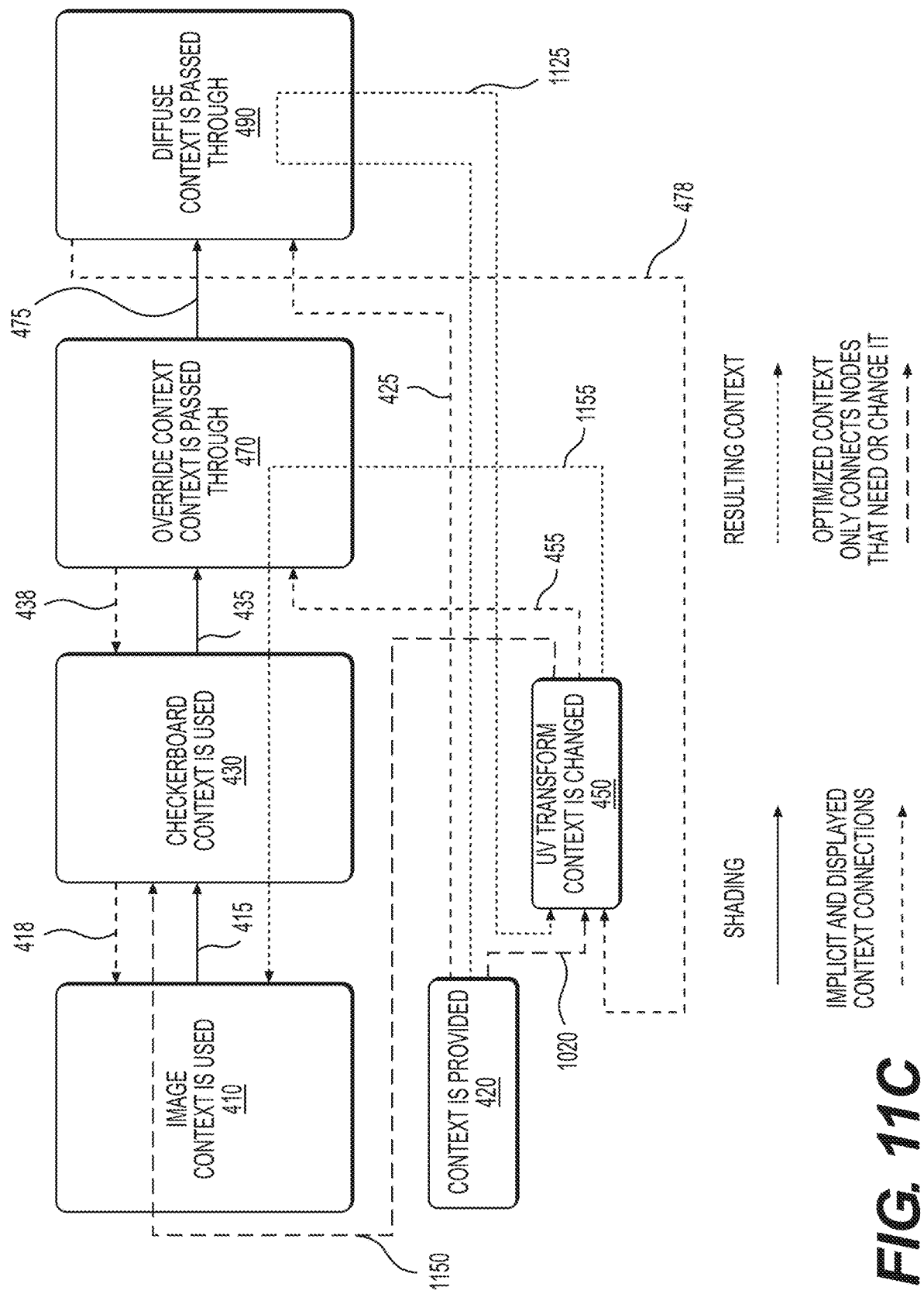
Figure 11D:
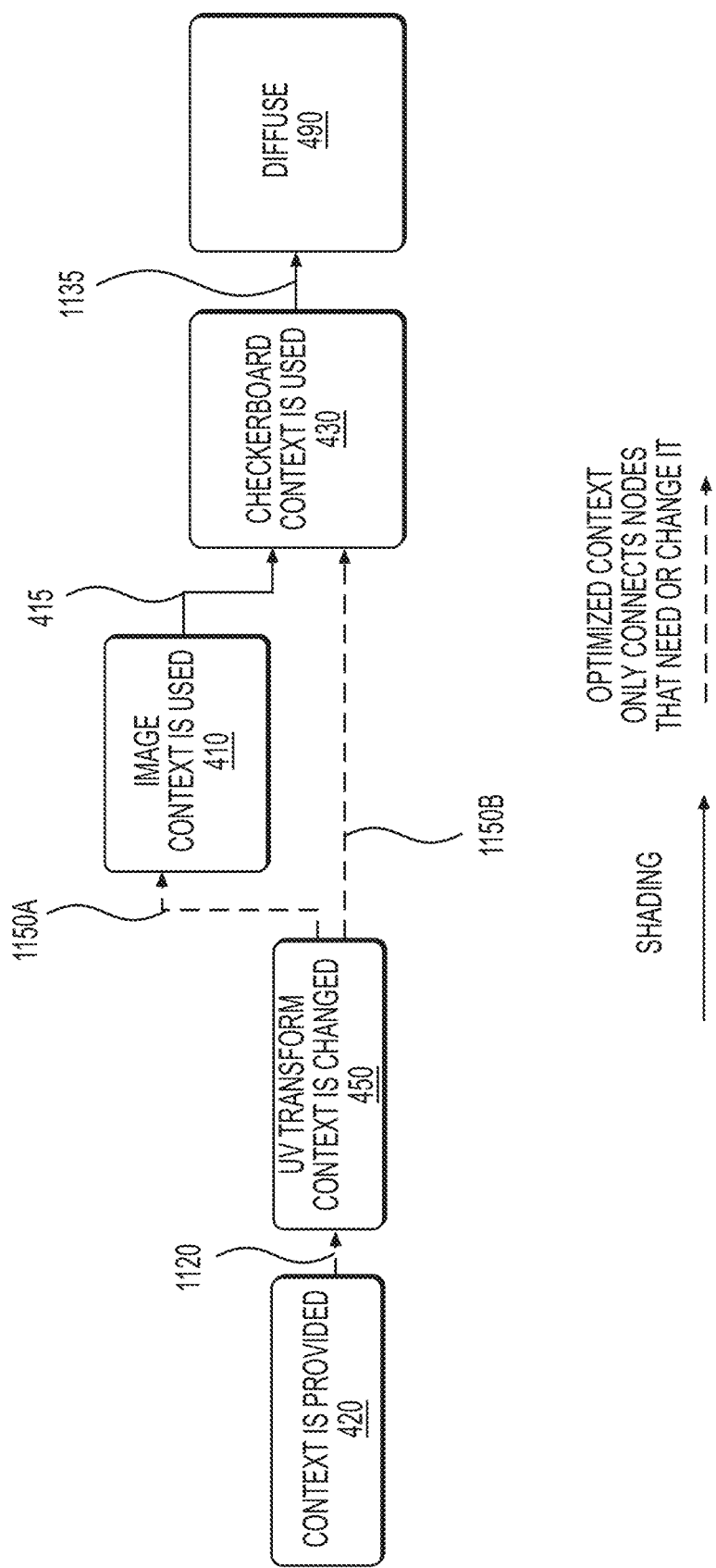

FIGS. 11A-11D will now be discussed in greater detail. As alluded to above, FIGS. 11A-11D illustrate movement of contexts between nodes, upon which the transformation of the shading graph of FIG. 4 to the optimized shading graph of FIG. 5 is based. Therefore, certain reference characters used in FIGS. 4-5 are equally used in FIGS. 11A-11D for ease of understanding. FIG. 11A depicts an overview of various nodes and connections initially set in a shading graph. The connections 415, 435, and 475 represent shading connections between the nodes 410, 430, 470, and 490, and the connections 425 and 455 represent displayed (i.e., explicit) context connections between the nodes 420 and 490 and the nodes 450 and 470, respectively. The override context node 470 may receive its context from a corresponding port in the UV transform node 450 (i.e., result port of the UV transform node 450 in FIG. 4) via the explicit connection 455, and the diffuse node 490 may receive its context from a corresponding port in the input node 420 via the explicit connection 425.

FIG. 11B depicts implicit context connections generated based on the matching step described in reference to FIGS. 4 and 10. Particularly, the implicit connections 418, 438, and 478 are generated based on steps 1020-1050 in FIG. 10. The image node 410 may receive its context from a corresponding port in the checkerboard node 430 (i.e., port 434 in FIG. 4) via the implicit context connection 418, the checkerboard node 430 may receive its context from a corresponding port in the override context node 470 (i.e., port 474 in FIG. 4) via the implicit context connection 438, and the UV transform node 450 may receive its context from a corresponding port in the diffuse node 490 (i.e., port 494 in FIG. 4) via the implicit context connection 478.

Notably, the context received by the override context node 470 via the explicit context connection 455 may be passed through to the checkerboard node 430 via the implicit context connection 438, without being modified (suggested by the node-internal connection 482 in FIG. 4). Similarly, the context received by the diffuse node 490 via the explicit context connection 425 may be passed through to the UV transform node 450 via the implicit context connection 478, without being modified (suggested by the node-internal connection 496 in FIG. 4). In contrast, the UV transform node 450 may modify the received context and provide it to the override context node 470 via the explicit context connection 455. Further, the nodes 410 and 430 may use the contexts received via the implicit context connections 418 and 438 respectively, and the input node 420 may merely provide a context via the explicit context connection 425.

Based on the analyses of the nodes in FIG. 11B, optimized context connections may be determined in FIG. 11C. The optimized context connections may be utilized in transforming the initial shading graph (e.g., FIG. 4) to the optimized shading graph (e.g., FIG. 5). For example, the optimized context connection 1020 from the input node 420 to the UV transform node 450 may be identified upon determining that the context received at the diffuse node 490 from the input node 420 may be passed through to the UV transform node 450 without being modified, as indicated by the actual context path 1125. Further, the optimized context connection 1150 from the UV transform node 450 to the checkerboard node 430 may be identified upon determining that the context received at the override context node 470 from the UV transform node 450 may be passed through to the checkerboard node 430 and the image node 410 without being modified, as indicated by the actual context path 1155. It is noted that the context received at the checkerboard node 430 is passed through to the image node 410 without being modified, therefore the contexts received at both the checkerboard node 430 and the image node 410 may be the same. This is achieved in part by the node-internal connection 442 in FIG. 4.

FIG. 11D illustrates the optimized shading graph generated based on the analyses performed with respect to the nodes/connections and the optimized context connections generated based on the analyses. As explained above, an optimized shading graph such as the one depicted in FIG. 11D may illustrate the entire data flow utilizing only explicit connections going from upstream to downstream (e.g., including shading connections and context connections). In FIG. 11D, the nodes are also visually rearranged based on the optimized context connections 1120, 1150 (which is broken down to optimized context connections 1150A and 1150B) and shading connections 415 and 1135. The override context node 470 and connections coupled thereto are removed, as the node 470 is no longer active/operative.

More particularly, the input node 420 has been moved to the leftmost position since it provides a context to the UV transform node 450 via the optimized context connection 1120. The UV transform node 450 is thus positioned next to the input node 420. The UV transform node 450 is then connected to the image node 410 and the checkerboard node 430 via the optimized context connections 1150A and 1150B respectively, which are generated based on the optimized context connection 1150 in FIG. 11C. A same context may be transmitted to the nodes 410 and 430 via the optimized context connections 1150A and 1150B respectively. The image node 410 is positioned between the UV transform node 450 and the checkerboard node 430 as it has a shading connection 415 providing its result to an input port of the checkerboard node 430. Finally, the diffuse node 490 is positioned at the rightmost position since it receives a result of the checkerboard node 430 via an input port. The connection through which the result is received is illustrated as a shading connection 1135, which has been generated based on the shading connections 435 and 475 in the prior FIGS. 11A-11C. The optimized shading graph of FIG. 11D is suitable for subsequent processing steps such as, for example, compilation of the shading graph into an executable representation.

FIGS. 12A-12D are a detailed exemplary step-by-step description of the process of transforming the shading graph of FIG. 4 to the optimized shading graph of FIG. 5. Therefore, certain reference characters used in FIGS. 4-5 are equally used in FIGS. 12A-12D for ease of understanding.

Figure 12A:
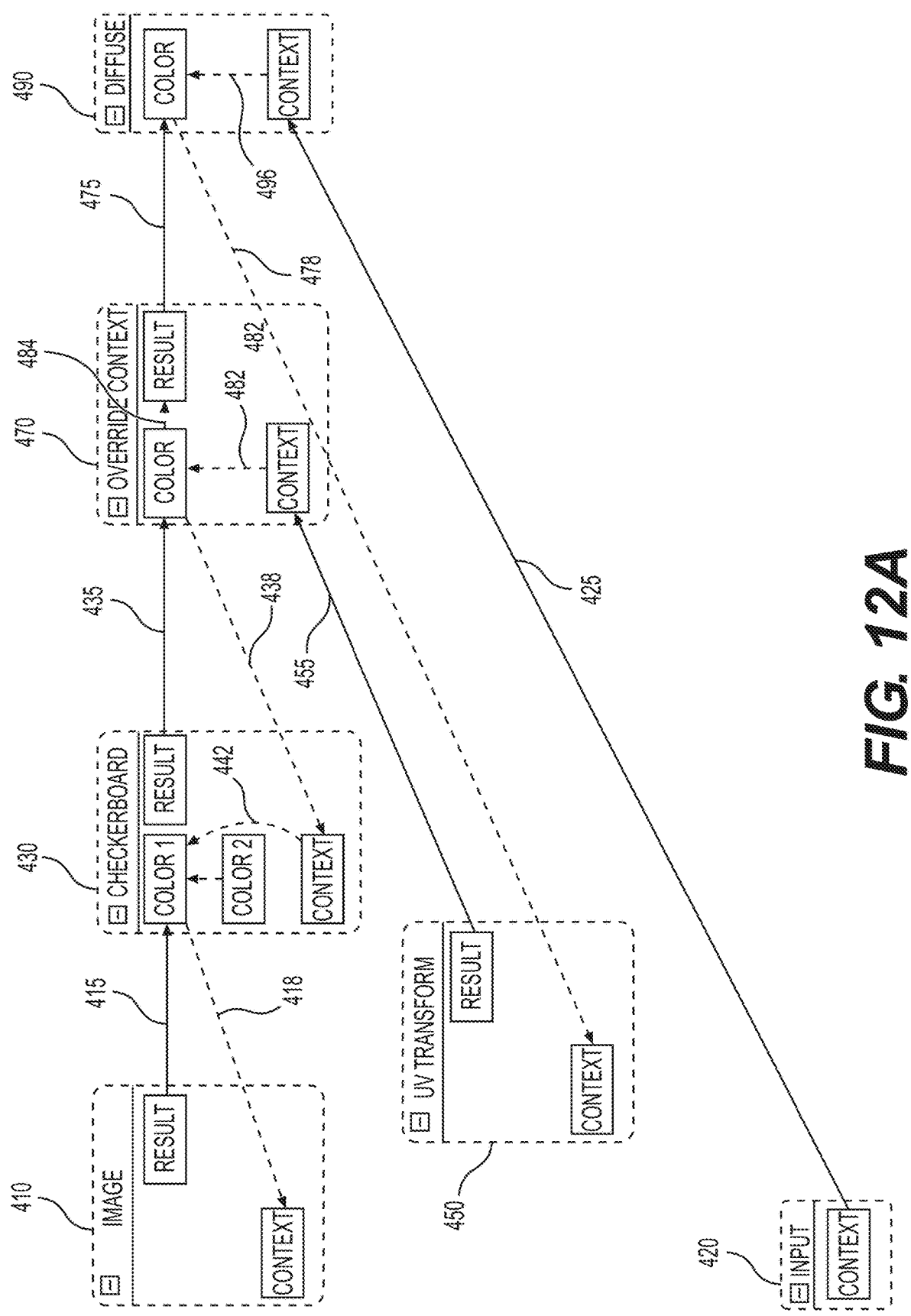
FIGS. 12A-12D are a detailed exemplary, step-by-step description of the process of transforming the shading graph of FIG. 4 to the optimized sharing graph of FIG. 5.

In FIG. 12A, one or more context ports may be matched to a corresponding port using the matching algorithm described in reference to FIG. 10. In particular, implicit context connections between nodes, or ports thereof, are identified using steps 1020-1050 in FIG. 10. For instance, the context port of the image node 410 is matched with the color 1 port of the checkerboard node 430 via the implicit context connection 418, and the context port of the checkerboard node 430 is matched with the color port of the override context node 470 via the implicit context connection 438. Further, the context port of the UV transform node 450 is matched with the color port of the diffuse node 490 via the implicit context connection 478.

The matching process for ports coupled to explicit context connections is more straightforward, as described above in reference to steps 1010-1015 in FIG. 10. For instance, the context port of the override context node 470 is matched with the result port of the UV transform node 450 via the explicit context connection 455, and the context port of the diffuse node 490 is matched with an output port of the input node 420 via the explicit context connection 425. It should also be noted that the override context node 470 just passes the values received at the color port to the result port without altering them, indicated by the node-internal connection 484.

Figure 12B:
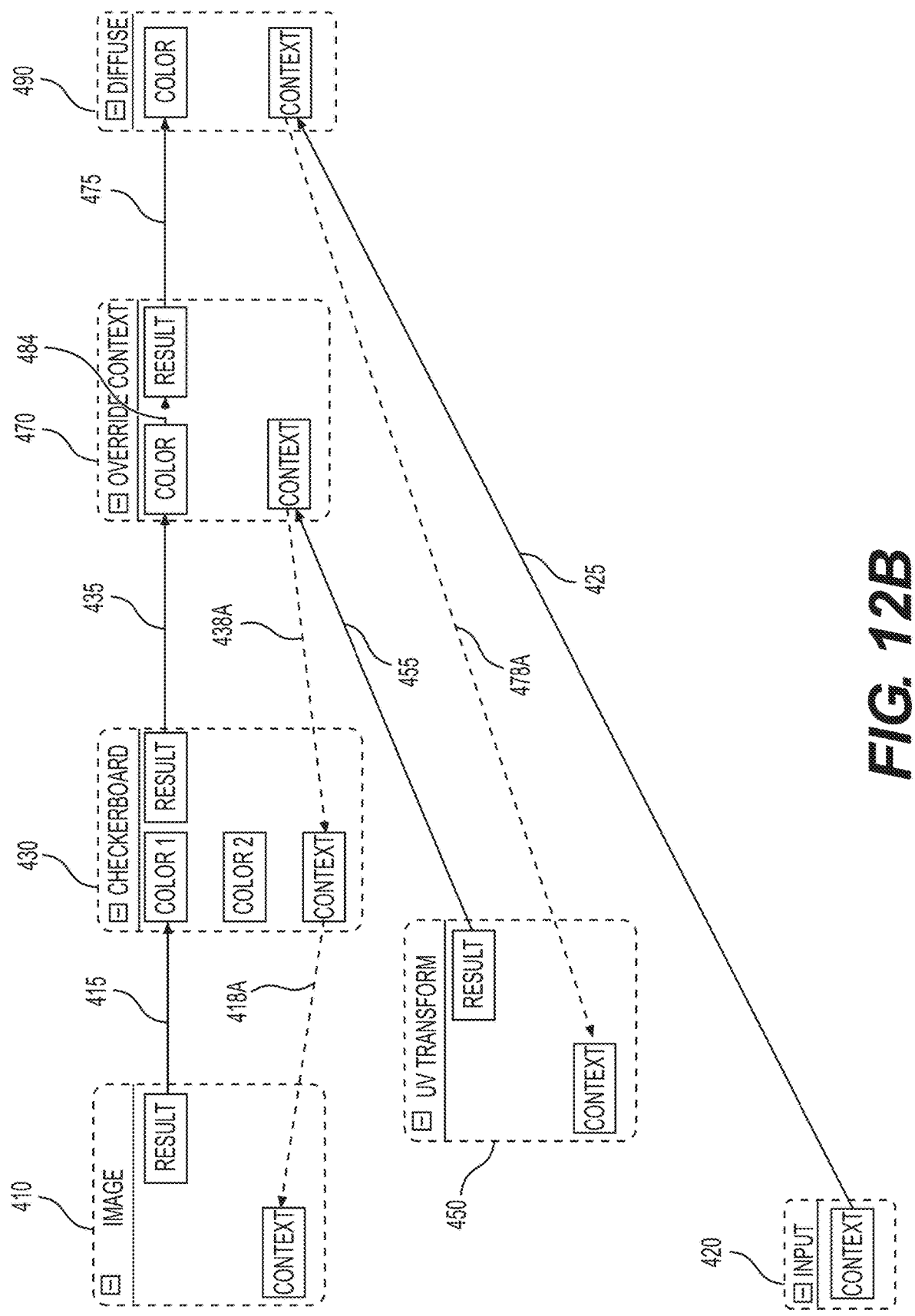

In FIG. 12B, one or more of the implicit context connections identified in FIG. 12A using the matching algorithm may be merged with a corresponding node-internal connection, thus generating an actual implicit context connection. The merge process comprises, for matching ports A (e.g., a port that is marked to introduce a context) and B (e.g., a context port) identified by the matching algorithm, i) determining a node-internal connection between port A that is marked to introduce a context and port C that provides a context value to port A within the same node, and ii) generating an actual implicit context connection from port C to port B. In the example of FIG. 12B, the implicit context connection 418 shown in FIG. 12A has been merged with the node-internal connection 442 shown in FIG. 12A, generating an actual context connection 418A. Further, the implicit context connection 438 shown in FIG. 12A has been merged with the node-internal connection 482 shown in FIG. 12A, generating an actual implicit context connection 438A. Furthermore, the implicit context connection 478 shown in FIG. 12A has been merged with the node-internal connection 496 shown in FIG. 12A, generating an actual implicit context connection 478A.

Figure 12C:
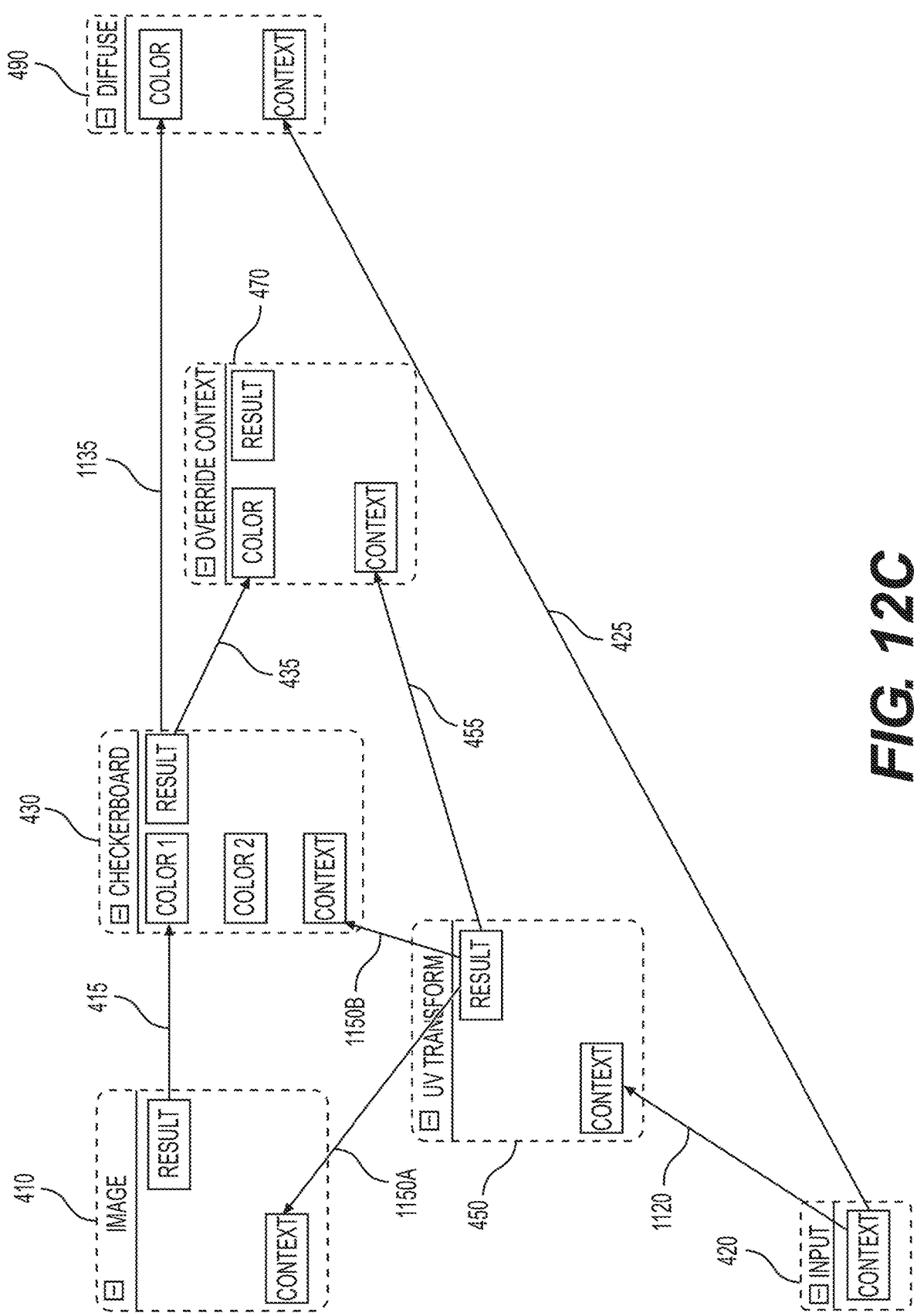

In FIG. 12C, shortcuts, i.e., optimized connections including but not limited to optimized context connections, are generated based on the connections that have been identified so far (e.g., shading connections, explicit context connections, and actual implicit context connections). For example, when values can be passed from port X to port Z via port Y (ports X, Z, and Y each belonging to a different node), a connection from port X to port Z is generated while the connection from port Y to port Z is removed. Therefore, the shortcut creation process comprises i) determining whether there are any paths X→Y→Z in the graph and ii) for each determined path X→Y→Z, creating a shortcut from X→Z and removing the connection Y→Z. For ease of understanding, ports X, Y, and Z will also be referred to as a source port (i.e., a port that first provides values), an intermediate port (i.e., a port that receives values from a source port and passes them onto a final port), and a final port (i.e., a port that receives values from an intermediate port). The shortcut creation process will now be discussed in reference to the examples of FIGS. 12B-12C. In FIG. 12B, several X→Y—Z paths can be identified as follows:

| Port X (a source port) | Port Y (an intermediate port) | Port Z (a final port) |
|---|---|---|
| context-providing port of the input node 420 | context port of the diffuse node 490 | context port of the UV transform node 450 |
| result port of the UV transform node 450 | context port of the override context node 470 | context port of the checkerboard node 430 |
| result port of the UV transform node 450 | context port of the override context node 470 | context port of the image node 410 |
| result port of the checkerboard node 430 | color port of the override context node 470 | color port of the diffuse port 490 |

Once X→Y→Z paths are identified, for each of the X→Y→Z paths, a shortcut is generated from the source port to the final port, and the connection from the intermediate port to the final port is removed. A shortcut through which context values are provided is referred to as an optimized context connection. In the example of FIG. 12C, the following shortcuts are generated based on the identified X→Y→Z paths:

| Shortcuts generated | Corresponding source and final ports |
|---|---|
| shortcut 1120, i.e., an optimized context connection 1120 | context-providing port of the input node 420 and context port of the UV transform node 450 |
| shortcut 1150B, i.e., an optimized context connection 1150B | result port of the UV transform node 450 and context port of the checkerboard node 430 |
| shortcut 1150A, i.e., an optimized context connection 1150A | result port of the UV transform node 450 and context port of the image node 410 |
| shortcut 1135, i.e., an optimized shading connection 1135 | result port of the checkerboard node 430 and color port of the diffuse port 490 |

Figure 12D:
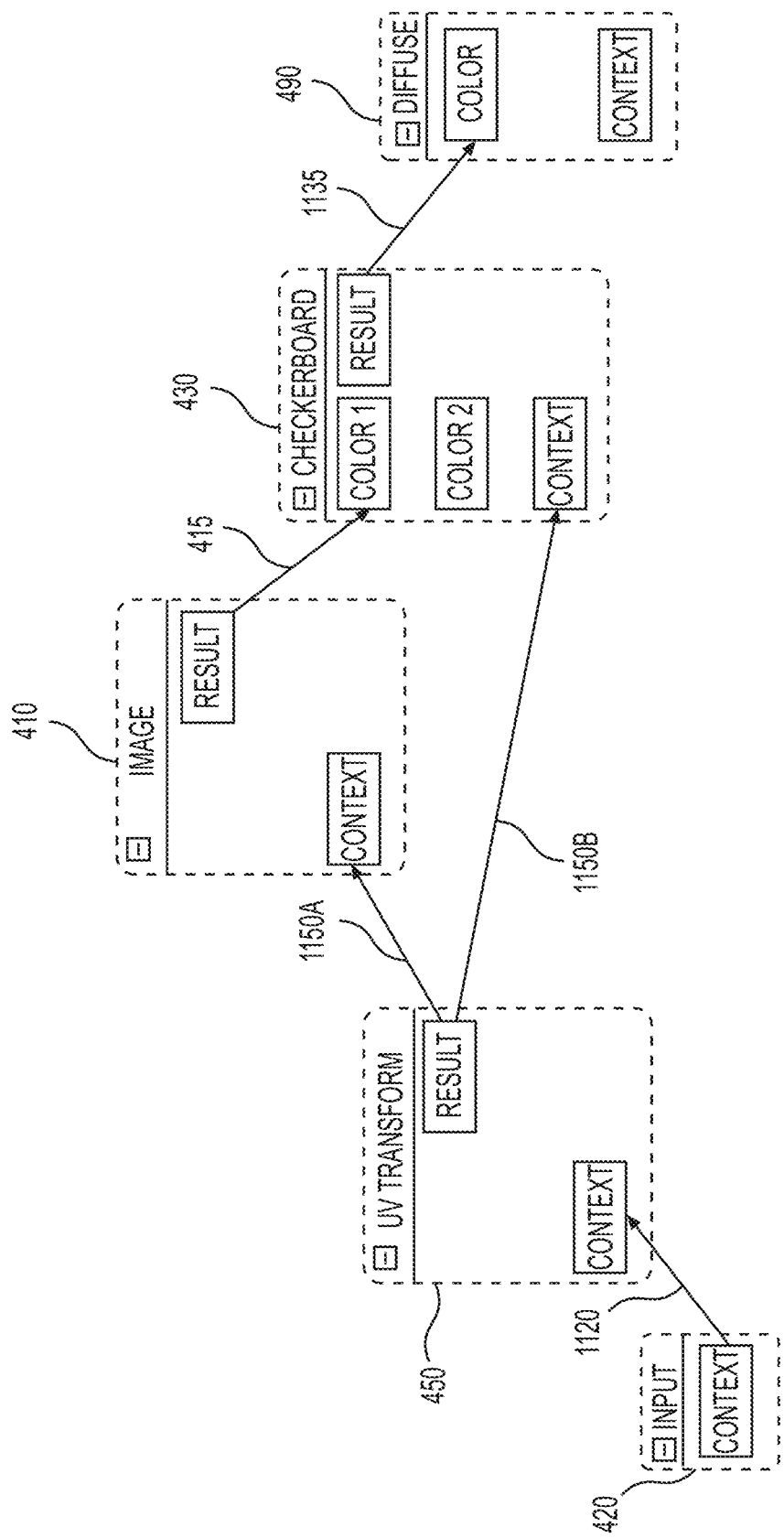

In FIG. 12D, any operator node whose output is no longer used in the newly-arranged nodes and connections in FIG. 12C is removed from the graph. For example, the result port of the override context node 470 is no longer used. Therefore, the override context node 470 is removed from the graph, along with the connections 435 and 455 thereto. Additionally, any connection to a context port (i.e., a context connection) of a node, which is designed to merely pass context values onto another node without using the context values internally, is removed. For example, because the diffuse node 490 is designed to merely pass the context values received from the input node 420 onto the UV transform node 450 without using the context values internally, and because the connection 1120 has been generated to provide the context values directly from the input node 420 to the UV transform node 450, the connection 425 is removed. FIG. 12D thus illustrates the optimized shading graph comprising optimized connections, after removing i) any operator node with an inactive output port (and connections from/to such an operator node) and ii) any context connection to a node that is designed to merely pass context values onto another node without using them internally. In summary, the optimized shading graph includes optimized connections after any inactive nodes/connections have been removed. Further, the positions of the nodes may be visually rearranged in order to illustrate the upstream-to-downstream data flow in a more user-friendly, easy-to-understand manner.

Figure 13:
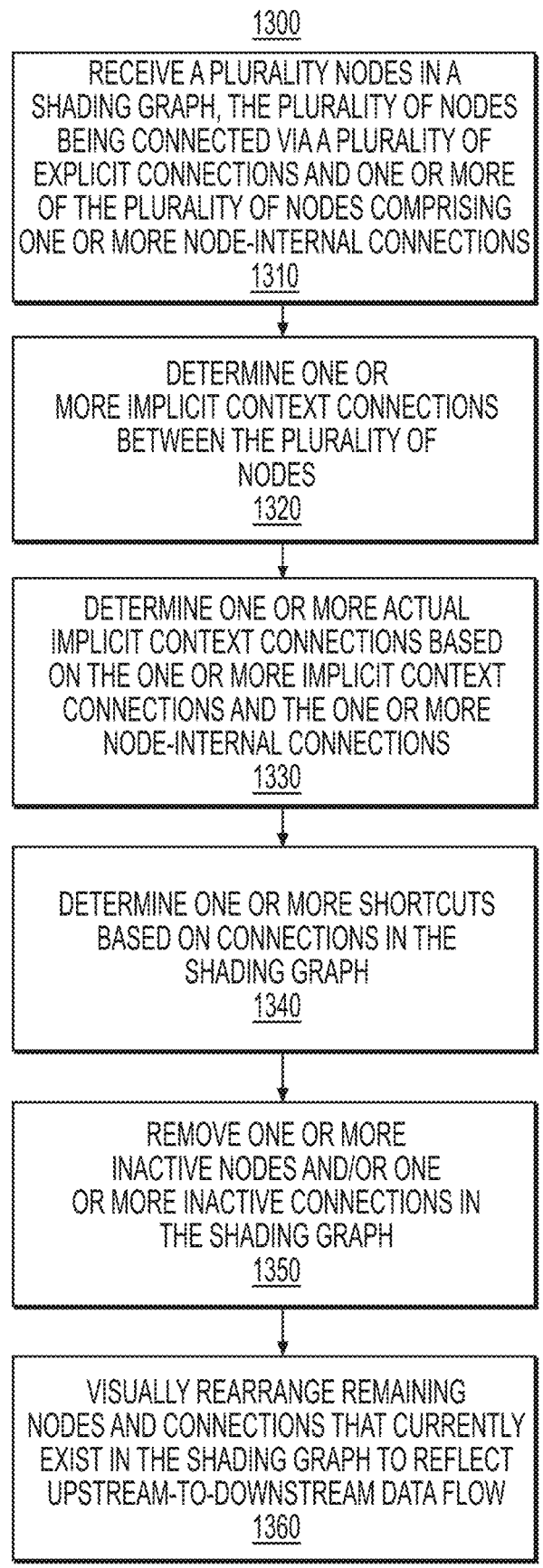
FIG. 13 is a flowchart illustrating an exemplary method of transforming a shading graph to an optimized shading graph.

FIG. 13 depicts a flowchart of an exemplary method 1300 of transforming a shading graph to an optimized shading graph. The method 1300 may be written in computer-readable instructions, and stored and executed by a computing device consistent with or similar to that depicted in FIG. 14. At step 1310, a processor of a computing device may receive a plurality of nodes in a shading graph, the plurality nodes being connected via a plurality of explicit connections. The plurality of explicit connections may comprise explicit shading connection(s) (e.g., explicit shading connections 415, 435, 475 in FIG. 12A) and/or explicit context connection(s) (e.g., explicit context connections 425, 455 in FIG. 12A). Further, certain nodes of the plurality of nodes may each comprise one or more node-internal connections (e.g., node-internal connections 442, 482, 484, 496 in FIG. 12A).

At step 1320, the processor may determine (e.g., generate) one or more implicit context connections between the plurality of nodes (or ports thereof), for example using the matching algorithm illustrated in reference to FIGS. 4 and 10. For each node that comprises a context port, the processor may determine whether the context port has an explicit context connection to a port of an upstream node. If such explicit context connection (e.g., explicit context connections 425, 455 in FIG. 12A) exists, the processor may simply transmit a context (or context values thereof) from the port of the upstream node to the context port of the node being processed. On the other hand, if such explicit context connection does not exist, the processor may determine whether an implicit context connection exists. To that end, the processor may determine whether a downstream node exists that has a port marked to introduce a context corresponding to the context port of the node being processed. If such a downstream node exists, the processor may determine that an implicit context connection (e.g., implicit context connections 418, 438, 478 in FIG. 12A) exists between the context port (of the node being processed) and the port marked to introduce a context (of the downstream node). A context may be transmitted from the marked port of the downstream node to the context port of the node being processed via the implicit context connection.

At step 1330, the processor may determine (e.g., generate) one or more actual implicit context connections based on the one or more implicit context connections and the one or more node-internal connections. Specifically, for each pair of nodes connected via an implicit context connection, the processor may determine whether a node-internal connection exists in the first node of the two nodes (i.e., in the node from which a context is provided). The node-internal connection (e.g., node-internal connections 442, 482, 484, 496 in FIG. 12A) may transfer a context from a context port to another port, all within the first node. Once the node-internal connection has been determined, the processor may determine (e.g., generate) an actual implicit context connection (e.g., actual implicit context connections 418A, 438A, 478A in FIG. 12B) from the context port in the first node to a context port in the second node of the two nodes.

At step 1340, the processor may determine (e.g., generate) one or more shortcuts based on the connections in the shading graph. The connections may include one or more of the explicit connections, implicit context connections, and actual implicit context connections in the shading graph. The manner in which the shortcuts are determined is described above in reference to FIG. 12C. For instance, the processor may determine one or more paths (e.g., X→Y→Z) in the shading graph, each path connecting a first port to a third port through a second port (i.e., connecting a source port to a final port through an intermediate port). The path may span two or more nodes in the shading graph, and the first, second, and third ports may be connected via explicit and/or implicit connections. For each of the determined paths, the processor may determine (e.g., generate) an optimized connection (e.g., optimized connections 1120, 1135, 1150A, 1150B in FIG. 12C) from the first port to the third port. The optimized connection is a shortcut. The optimized connection may be an optimized context connection (e.g., optimized context connections 1120, 1150A, 1150B in FIG. 12C) if the third port is a context port. Otherwise, the optimized connection may be an optimized shading connection (e.g., optimized shading connection 1135 in FIG. 12C). In addition to determining the optimized connection from the first port to the third port, the processor may remove the connection between the second port and the third port. For example, in FIG. 12C, the connections 418A, 438A, 475, and 478A shown in FIG. 12B have been removed via the shortcut generation step 1340.

At step 1350, the processor may remove inactive nodes and/or inactive connections in the shading graph. Inactive nodes may include any operator node whose output is no longer used in the nodes/connections that have been newly arranged via steps 1310-1340 (e.g., the override context node 470 in FIG. 12C). Inactive connections may include any connection to such operator node whose output is no longer used (e.g., the explicit shading connection 435 and the explicit context connection 455 in FIG. 12C), and may also include any context connection to a node that is designed to merely pass context values onto another node without using the context values internally (e.g., the explicit context connection 425 in FIG. 12C). At step 1360, the processor may visually rearrange the nodes and connections that currently exist in the shading graph to reflect the upstream-to-downstream data flow (e.g., FIG. 12D).

Figure 6:
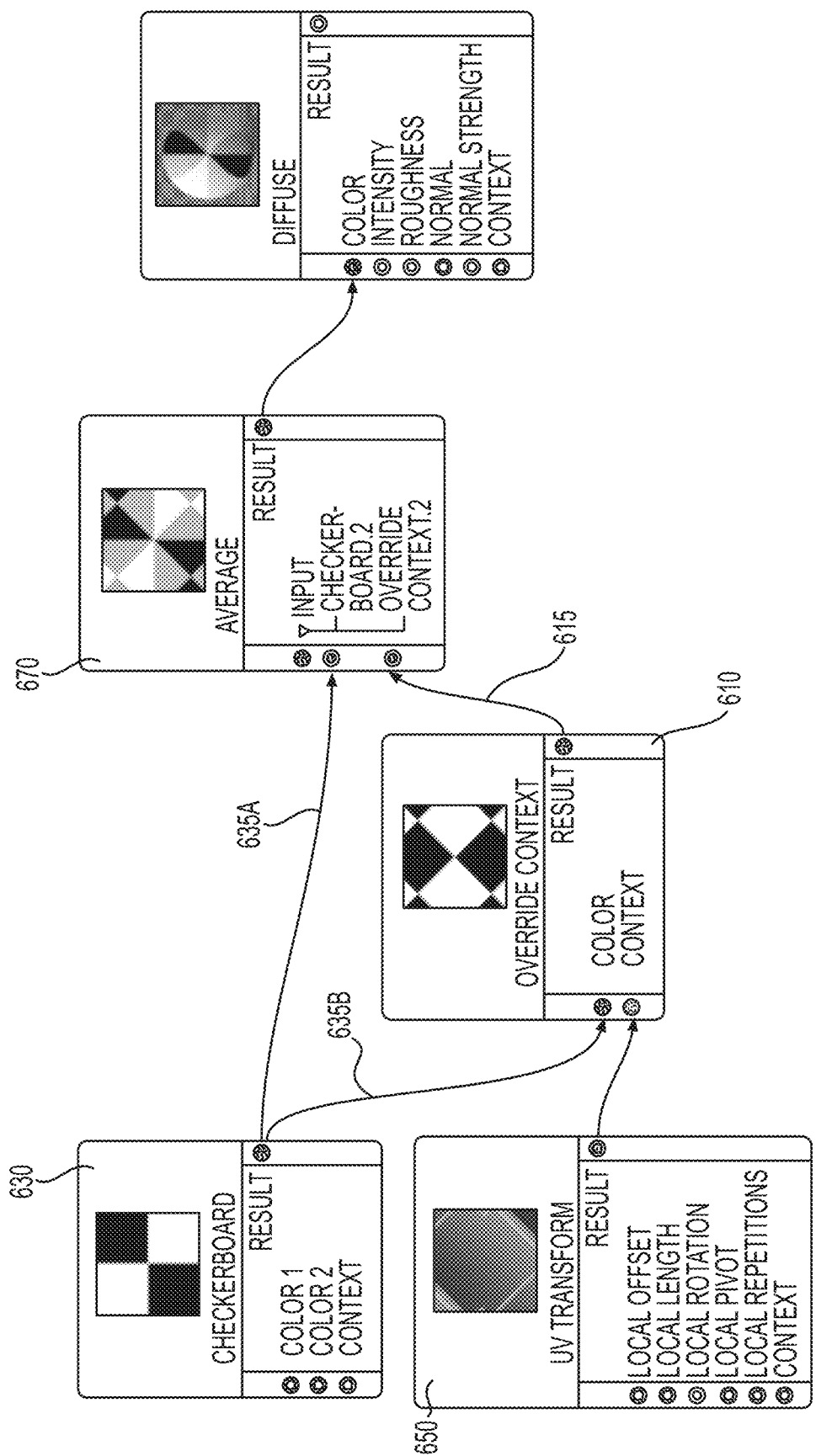
FIGS. 6-7 show additional examples of a shading graph and an optimized shading graph in a 3D modeling application, for the purpose of illustrating an alternative shading graph transformation process.
Figure 7:
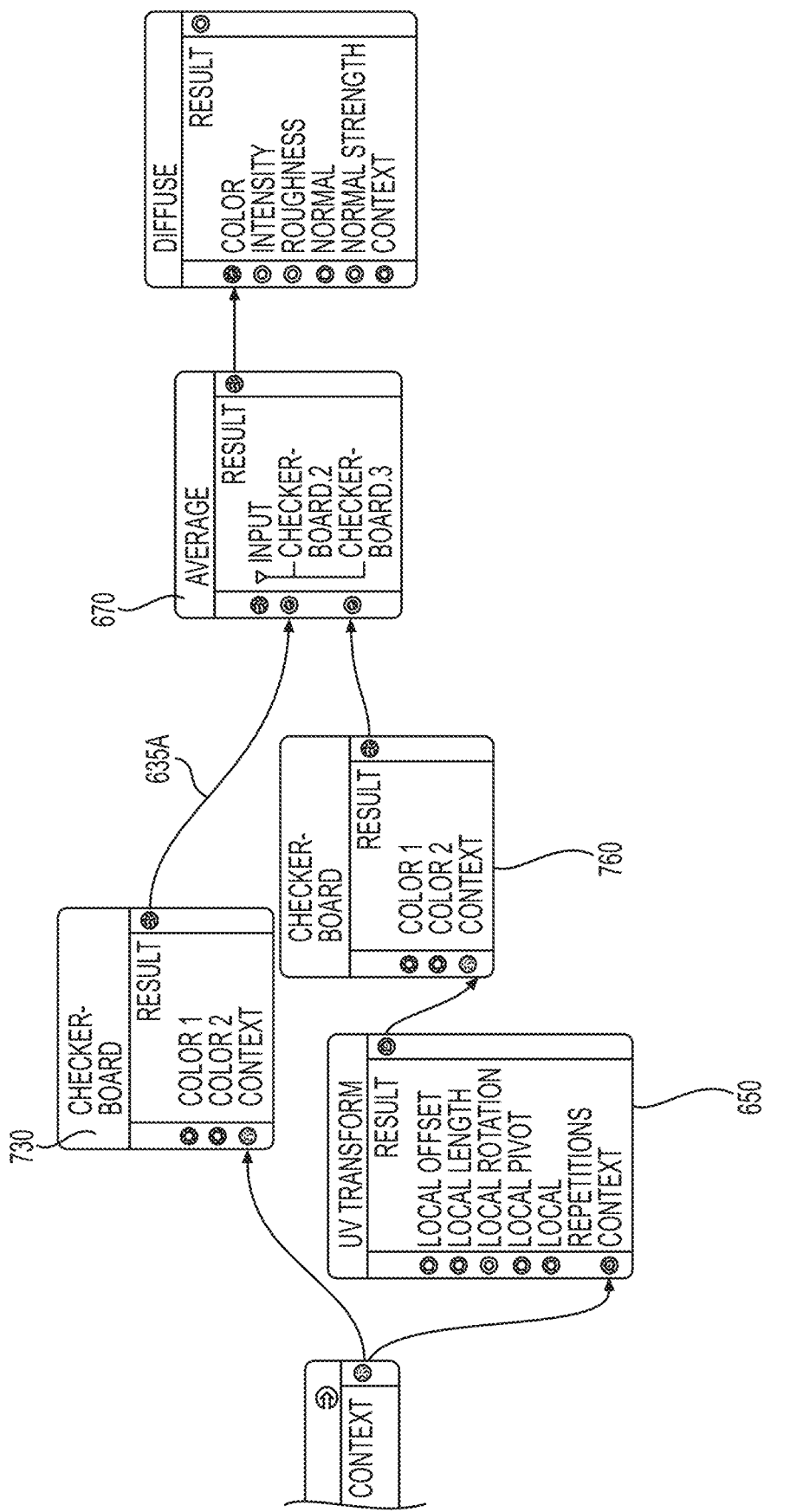

The transformation stage illustrated in FIGS. 11A-11D, 12A-12D, and 13 may lead to a multiplication of subgraphs/nodes, namely if one node is used in different contexts. For example, in FIG. 6, which depicts a shading graph prior to transformation, the checkerboard node 630 may be used for contexts received from nodes connected via connections 635A, 635B (i.e., from the override context node 610, which may cause a rotation, and the average node 670) via implicit downstream-to-upstream connections, and may output computed values/results back to those nodes. Specifically, the checkerboard node 630 may be used once unmodified and once rotated by 45 degrees. As a result, the optimized graph may contain two checkerboard nodes 730 and 760, as shown in FIG. 7. The override context node 610 may be removed, as it is only used to inject context data from the UV transform node 650, and to return the result from the checkerboard node 630 unaltered to the average node 670 via connections 635B and 615.

In the shading graph contemplated in the present disclosure, a node may be compiled into an executable representation, which may be used as a function. Such a function may be called with arbitrary arguments for parameters such as, for example, externally-supplied input values discussed above in paragraph 35. Certain nodes such as, for example, a blur node, may need to evaluate their upstream subgraph/node for an arbitrary number of shading contexts, which subgraph multiplication discussed above may not be able to handle. Therefore, under those circumstances, the compilation of the upstream subgraph/node to a function which includes the context as a parameter may be supported for faster execution. While the compilation time may result in a slight overhead, the compilation might need to take place only once and may need to be repeated only when the shading graph and/or the source code changes. An alternative method of execution is to interpret the node graph each time it needs to be evaluated, which is slower, but avoids the overhead of compilation. The solution for the downstream-to-upstream data flow described above in paragraph 31 may also be supported.

Figure 8:
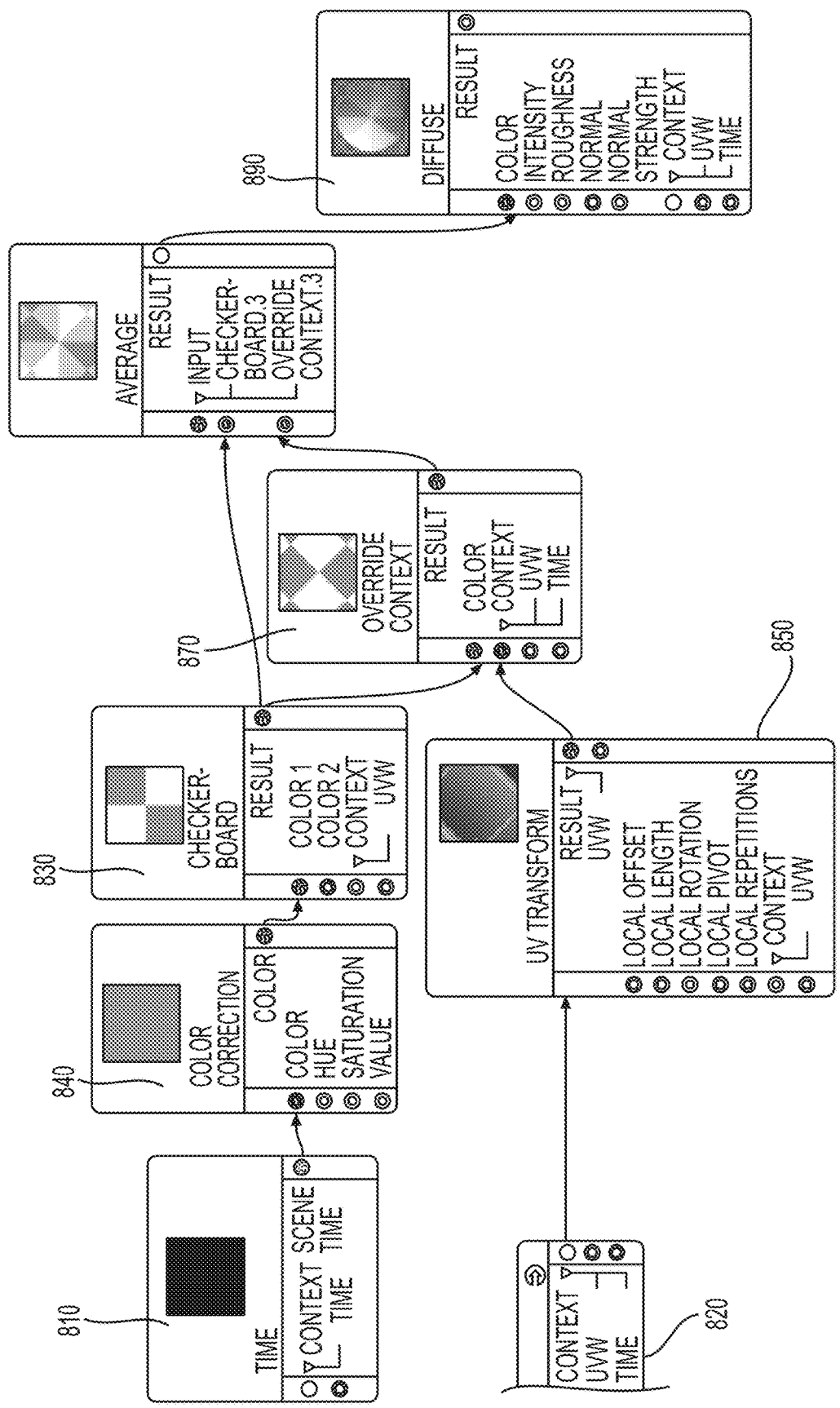
FIGS. 8-9 show additional examples of a shading graph and an optimized shading graph in a 3D modeling application, for the purpose of illustrating an alternative shading graph transformation process.
Figure 9:
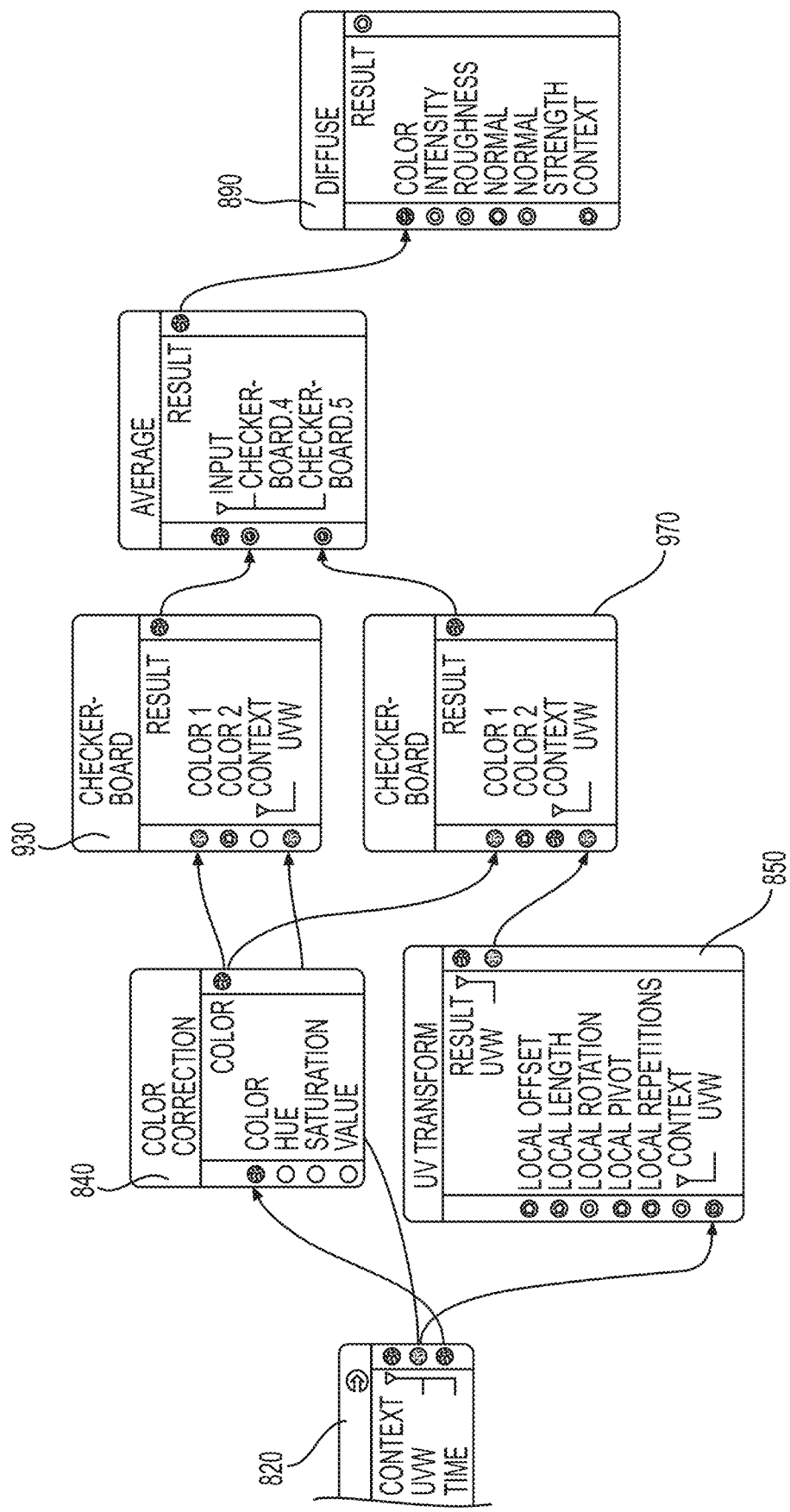

As discussed above, a shading context may comprise multiple members/parameters such as, for example, point coordinates of a point, information about the point, scene time, etc. Context modifier nodes (nodes that modify a received context such as, for example, a rotation node) might only modify the point coordinates, but may keep the rest unaltered. Therefore, when such a context modifier node sets up a new complete context, a lot of unnecessary data copying may be performed (i.e., copying of data that remains unaltered). To circumvent this unnecessary computation overhead, a context may be split into multiple independent parts, namely subcontexts. Then, a context modifier node may only need to set up a new subcontext for the point coordinates, but the rest of the context may be passed through unaltered. In FIG. 8, a context may be split into subcontexts UVW (i.e., surface point coordinates) and Time (as shown in the nodes 810, 820, 830, 850, 870, 890), both of which are represented as nested ports under the context port. Whenever two context ports are connected, their corresponding nested ports may be connected as well. The UV transform node 850, which may be set up as a rotation node, might only modify the subcontext UVW. Further, the checkerboard node 830 might only need the subcontext UVW, and the time node 810 might only need the subcontext Time. FIG. 9 shows an optimized shading graph that has been transformed from the shading graph of FIG. 8, and that includes an upstream-to-downstream data flow. Again, because the checkerboard node 830 in FIG. 8 may be used once unmodified and once rotated by 45 degrees, the optimized graph in FIG. 9 may contain two checkerboard nodes 930 and 970.

One benefit of the context split method may be that, because the result of the color correction node 840 only depends on the subcontext Time, it might need to be evaluated only once, as the UV transform node 850 may modify just the subcontext UVW. Without the context split, the system might not be able to know this, and may thus insert the color correction node 840 twice into the optimized graph of FIG. 9.

The benefits of the techniques proposed in the present disclosure include:

Each node may clearly state which parts of the context it needs, which parts it modifies and where that modified context is introduced, so the context passing may be made explicit in the shading graph. Some or all of these functions may be performed within the shading graph, for example via port markers, node-internal context connections, etc. Solutions which pass the context upstream via function calls (e.g., the usual solution described above in paragraph 31) may be less explicit because they may not show which parts of the context a function needs or modifies. Even if they support this feature, it might be via extra information about the function, and might not be in terms of the shading graph.

The split of the context may avoid unnecessary copying and/or execution of unmodified parts.

The mixed upstream-to-downstream and downstream-to-upstream dataflow may be transformed into an upstream-to-downstream dataflow, which may be easier to analyze for subsequent steps such as, for example, compilation of the shading graph into an executable representation, etc. Also, as explained above, unnecessary duplicate evaluation and functional calls can be avoided by this transformation.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 14:
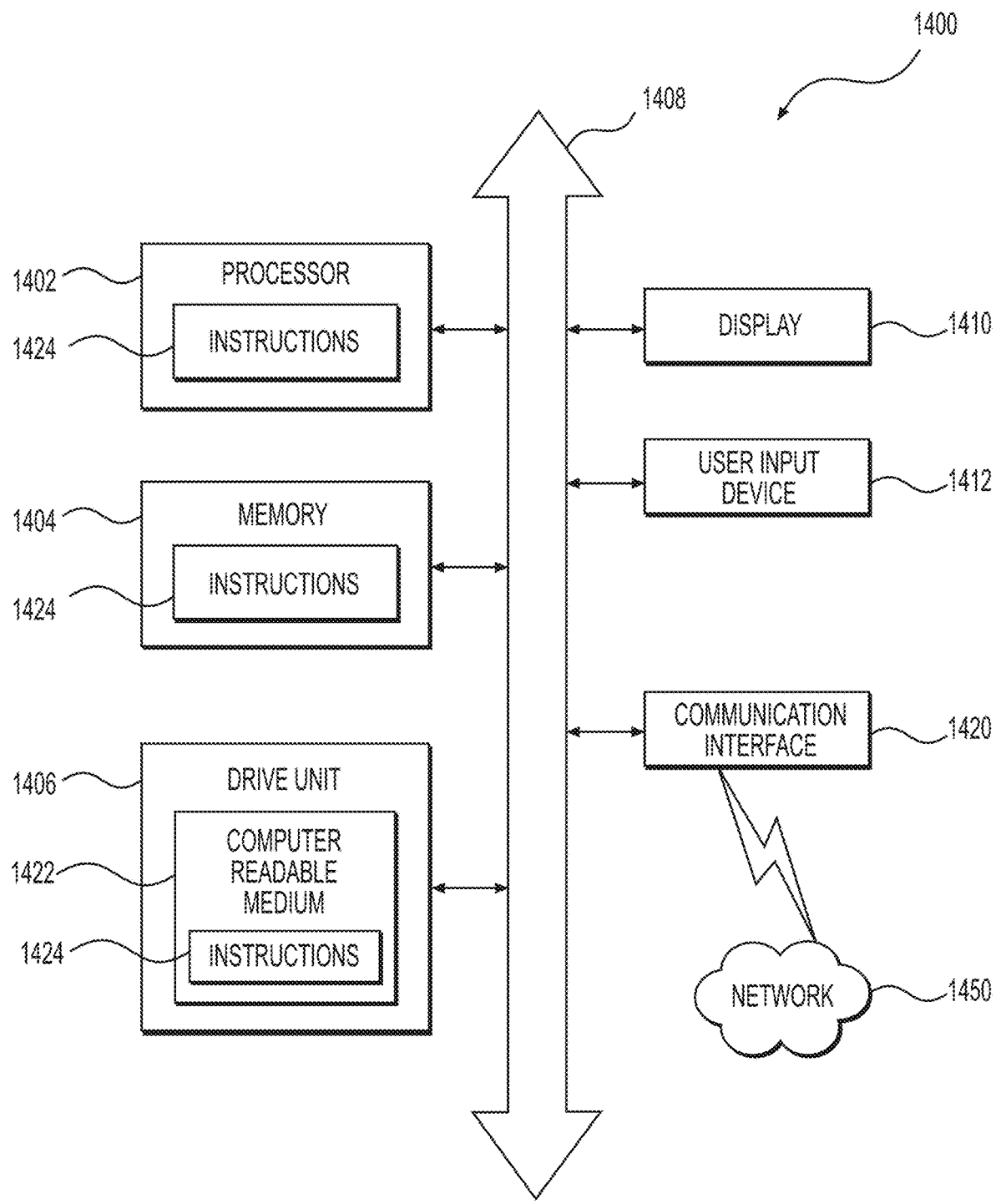
FIG. 14 illustrates an implementation of a computer system that may execute techniques presented herein.

FIG. 14 illustrates an implementation of a computer system that may execute techniques presented herein. The computer system 1400 can include a set of instructions that can be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1400 can be implemented using electronic devices that provide voice, video, or data communication. Further, while a single computer system 1400 is illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1404 includes a cache or random-access memory for the processor 1402. In alternative implementations, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described herein may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1400 may further include a display unit 1410, such as a liquid crystal display (LCD), an organic light emitting diode (OLED), a flat panel display, a solid-state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1406.

Additionally or alternatively, the computer system 1400 may include an input device 1412 configured to allow a user to interact with any of the components of system 1400. The input device 1412 may be a number pad, a keyboard, or a cursor control device, such as a mouse, or a joystick, touch screen display, remote control, or any other device operative to interact with the computer system 1400.

The computer system 1400 may also or alternatively include a disk or optical drive unit 1406. The disk drive unit 1406 may include a computer-readable medium 1422 in which one or more sets of instructions 1424, e.g. software, can be embedded. Further, the instructions 1424 may embody one or more of the methods or logic as described herein. The instructions 1424 may reside completely or partially within the memory 1404 and/or within the processor 1402 during execution by the computer system 1400. The memory 1404 and the processor 1402 also may include computer-readable media as discussed above.

In some systems, a computer-readable medium 1422 includes instructions 1424 or receives and executes instructions 1424 responsive to a propagated signal so that a device connected to a network 1450 can communicate voice, video, audio, images, or any other data over the network 1450. Further, the instructions 1424 may be transmitted or received over the network 1450 via a communication port or interface 1420, and/or using a bus 1408. The communication port or interface 1420 may be a part of the processor 1402 or may be a separate component. The communication port 1420 may be created in software or may be a physical connection in hardware. The communication port 1420 may be configured to connect with a network 1450, external media, the display 1410, or any other components in system 1400, or combinations thereof. The connection with the network 1450 may be a physical connection, such as a wired Ethernet connection or may be established wirelessly as discussed below. Likewise, the additional connections with other components of the system 1400 may be physical connections or may be established wirelessly. The network 1450 may alternatively be directly connected to the bus 1408.

While the computer-readable medium 1422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1422 may be non-transitory, and may be tangible.

The computer-readable medium 1422 can include a solid-state memory such as a memory card or other package that houses one or more non-volatile read-only memories. The computer-readable medium 1422 can be a random-access memory or other volatile re-writable memory. Additionally or alternatively, the computer-readable medium 1422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1400 may be connected to one or more networks 1450. The network 1450 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 1450 may include wide area networks (WAN), such as the Internet, local area networks (LAN), campus area networks, metropolitan area networks, a direct connection such as through a Universal Serial Bus (USB) port, or any other networks that may allow for data communication. The network 1450 may be configured to couple one computing device to another computing device to enable communication of data between the devices. The network 1450 may generally be enabled to employ any form of machine-readable media for communicating information from one device to another. The network 1450 may include communication methods by which information may travel between computing devices. The network 1450 may be divided into sub-networks. The sub-networks may allow access to all of the other components connected thereto or the sub-networks may restrict access between the components. The network 1450 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It may mean that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for generating an optimized shading graph in a modeling application, the method comprising:
   receiving a plurality of nodes in a shading graph, the plurality of nodes being connected via a plurality of explicit connections and one or more of the plurality of nodes comprising one or more internal connections;
   determining one or more implicit context connections between the plurality of nodes;
   determining one or more actual implicit context connections based on the one or more implicit context connections and the one or more internal connections;
   determining one or more shortcuts based on one or more of i) the plurality of explicit connections, ii) the one or more implicit context connections, and iii) the one or more actual implicit context connections; and
   removing one or more inactive nodes and/or one or more inactive connections in the shading graph.

2. The computer-implemented method of claim 1, wherein the plurality of explicit connections comprises at least one of:
   one or more explicit shading connections; and
   one or more explicit context connections.

3. The computer-implemented method of claim 1, wherein the plurality of explicit connections comprise at least one explicit context connection, through which a context is transmitted from a port of a first node to a port of a second node that is downstream relative to the first node.

4. The computer-implemented method of claim 1, wherein determining one or more implicit context connections between the plurality of nodes comprises, for each of the plurality of nodes that comprises a context port not coupled to an explicit context connection:
   determining a downstream node;
   determining that the downstream node is reached through a reached port marked to introduce a context;
   determining that the reached port introduces a corresponding context; and
   determining an implicit context connection between the context port and the reached port.

5. The computer-implemented method of claim 1, wherein determining one or more actual implicit context connections based on the one or more implicit context connections and the one or more internal connections comprises, for each pair of nodes connected via an implicit context connection:
   determining an internal connection in a first node, of the pair of nodes, from which a context is provided, the internal connection transferring the context from a first port to a second port within the first node; and
   determining an actual implicit context connection between the first port to a context port in a second node, of the pair of nodes, to which the context is provided.

6. The computer-implemented method of claim 5, wherein the first port is a context port in the first node.

7. The computer-implemented method of claim 1, wherein determining one or more shortcuts based on one or more of i) the plurality of explicit connections, ii) the one or more implicit context connections, and iii) the one or more actual implicit context connections comprises:
   determining one or more paths in the shading graph, each path connecting a first port to a third port through a second port, the first, second, and third ports being connected via explicit and/or implicit connections; and
   for each of the one or more paths, determining an optimized connection from the first port to the third port and removing a connection from the second port to the third port.

8. The computer-implemented method of claim 7, wherein:
   the optimized connection is an optimized shading connection if the third port is not a context port; and
   the optimized connection is an optimized context connection if the third port is a context port.

9. The computer-implemented method of claim 7, wherein each of the one or more paths spans two or more nodes of the plurality of nodes.

10. The computer-implemented method of claim 7, wherein the optimized connection is a shortcut.

11. A system comprising:
   at least one processor;
   at least one storage device storing instructions which, when executed by the at least one processor, cause the at least one processor to perform operations for generating an optimized shading graph in a modeling application, the operations comprising:
      receiving a plurality of nodes in a shading graph, the plurality of nodes being connected via a plurality of explicit connections and one or more of the plurality of nodes comprising one or more internal connections;
      determining one or more implicit context connections between the plurality of nodes;
      determining one or more actual implicit context connections based on the one or more implicit context connections and the one or more internal connections;
      determining one or more shortcuts based on one or more of i) the plurality of explicit connections, ii) the one or more implicit context connections, and iii) the one or more actual implicit context connections; and
      removing one or more inactive nodes and/or one or more inactive connections in the shading graph.

12. The system of claim 11, wherein the plurality of explicit connections comprises at least one of:
   one or more explicit shading connections; and
   one or more explicit context connections.

13. The system of claim 11, wherein the plurality of explicit connections comprise at least one explicit context connection, through which a context is transmitted from a port of a first node to a port of a second node that is downstream relative to the first node.

14. The system of claim 11, wherein determining one or more implicit context connections between the plurality of nodes comprises, for each of the plurality of nodes that comprises a context port not coupled to an explicit context connection:
   determining a downstream node;
   determining that the downstream node is reached through a reached port marked to introduce a context;
   determining that the reached port introduces a corresponding context; and
   determining an implicit context connection between the context port and the reached port (through which a context is transmitted from the reached port to the context port).

15. The system of claim 11, wherein determining one or more actual implicit context connections based on the one or more implicit context connections and the one or more internal connections comprises, for each pair of nodes connected via an implicit context connection:
   determining an internal connection in a first node, of the pair of nodes, from which a context is provided, the internal connection transferring the context from a first port to a second port within the first node; and
   determining an actual implicit context connection between the first port to a context port in a second node, of the pair of nodes, to which the context is provided.

16. The system of claim 15, wherein the first port is a context port in the first node.

17. The system of claim 11, wherein determining one or more shortcuts based on one or more of i) the plurality of explicit connections, ii) the one or more implicit context connections, and iii) the one or more actual implicit context connections comprises:
   determining one or more paths in the shading graph, each path connecting a first port to a third port through a second port, the first, second, and third ports being connected via explicit and/or implicit connections; and
   for each of the one or more paths, determining an optimized connection from the first port to the third port and removing a connection from the second port to the third port.

18. The system of claim 17, wherein:
   the optimized connection is an optimized shading connection if the third port is not a context port; and
   the optimized connection is an optimized context connection if the third port is a context port.

19. The system of claim 17, wherein the optimized connection is a shortcut.

20. At least one non-transitory computer readable medium storing instructions which, when executed by at least one processor, cause the at least one processor to perform operations for generating an optimized shading graph in a modeling application, the operations comprising:

receiving a plurality of nodes in a shading graph, the plurality of nodes being connected via a plurality of explicit connections and one or more of the plurality of nodes comprising one or more internal connections;

determining one or more implicit context connections between the plurality of nodes;

determining one or more actual implicit context connections based on the one or more implicit context connections and the one or more internal connections;

determining one or more shortcuts based on one or more of i) the plurality of explicit connections, ii) the one or more implicit context connections, and iii) the one or more actual implicit context connections; and removing one or more inactive nodes and/or one or more inactive connections in the shading graph.

* * * * *